United States Patent
Okada et al.

(10) Patent No.: US 12,299,987 B2
(45) Date of Patent: May 13, 2025

(54) IMAGE PROCESSING DEVICE AND IMAGE PROCESSING METHOD

(71) Applicant: DENSO TEN Limited, Kobe (JP)

(72) Inventors: Yasutaka Okada, Kobe (JP); Ryusuke Seki, Kobe (JP); Kengo Iino, Kobe (JP)

(73) Assignee: DENSO TEN Limited, Kobe (JP)

( * ) Notice: Subject to any disclaimer, the term of this patent is extended or adjusted under 35 U.S.C. 154(b) by 498 days.

(21) Appl. No.: 17/642,479

(22) PCT Filed: Nov. 6, 2020

(86) PCT No.: PCT/JP2020/041622
§ 371 (c)(1),
(2) Date: Mar. 11, 2022

(87) PCT Pub. No.: WO2021/090943
PCT Pub. Date: May 14, 2021

(65) Prior Publication Data
US 2022/0301315 A1    Sep. 22, 2022

(30) Foreign Application Priority Data

| Nov. 8, 2019 | (JP) | 2019-203263 |
| Nov. 8, 2019 | (JP) | 2019-203267 |
| Oct. 14, 2020 | (JP) | 2020-173513 |

(51) Int. Cl.
*G06V 20/52* (2022.01)
*G06T 7/11* (2017.01)
*G06V 20/58* (2022.01)

(52) U.S. Cl.
CPC .............. *G06V 20/52* (2022.01); *G06T 7/11* (2017.01); *G06V 20/58* (2022.01)

(58) Field of Classification Search
CPC ........ G06V 20/52; G06V 20/58; G06V 10/25; G06T 7/11; G06T 7/0002; H04N 7/183; G08G 1/017; G08G 1/04; G08G 1/0175
See application file for complete search history.

(56) References Cited

U.S. PATENT DOCUMENTS

2014/0307090 A1* 10/2014 Kobayashi ....... H04N 21/23476
                                                              348/143
2018/0165515 A1*  6/2018 Kusakabe ........... G06F 18/2193
(Continued)

FOREIGN PATENT DOCUMENTS

| CN | 101399915 A | 4/2009 |
| JP | 2003-046745 A | 2/2003 |

(Continued)

*Primary Examiner* — Andrae S Allison
(74) *Attorney, Agent, or Firm* — Oliff PLC

(57) ABSTRACT

An object to reduce a possibility that a detection target appearing in a captured image is not detected. In order to achieve such an object, an image processing device includes: a first detection unit that is configured to detect a predetermined object and a predetermined part of the predetermined object from an acquired captured image; a setting unit that sets a detection range in the captured image based on a detection result of the first detection unit in a case where only the predetermined object out of the predetermined object and the predetermined part has been detected by the first detection unit; and a second detection unit that attempts to detect the predetermined part in the detection range.

18 Claims, 23 Drawing Sheets

(56) References Cited

U.S. PATENT DOCUMENTS

| | | | |
|---|---|---|---|
| 2019/0050993 A1* | 2/2019 | Jang | G06V 10/82 |
| 2019/0266392 A1* | 8/2019 | Watanabe | G06V 40/103 |
| 2020/0202146 A1* | 6/2020 | Yanagi | G06V 20/582 |
| 2020/0273134 A1* | 8/2020 | Yoshida | H04W 4/02 |

FOREIGN PATENT DOCUMENTS

| | | | |
|---|---|---|---|
| JP | 2004-70834 | * | 3/2004 |
| JP | 2004-70834 A | | 3/2004 |
| JP | 2006-54719 | * | 2/2006 |
| JP | 2006-54719 A | | 2/2006 |
| JP | 2009-81714 | * | 4/2009 |
| JP | 2009-81714 A | | 4/2009 |
| JP | 2012-174186 | * | 9/2012 |
| JP | 2012-174186 A | | 9/2012 |
| JP | 2014-207541 | * | 10/2014 |
| JP | 2014-207541 A | | 10/2014 |
| JP | 2015-064752 A | | 4/2015 |
| JP | 2016-12752 A | | 1/2016 |
| JP | 2018-041273 A | | 3/2018 |
| JP | 2018-124825 A | | 8/2018 |
| JP | 2018-205835 A | | 12/2018 |
| JP | 2019-071050 A | | 5/2019 |
| JP | WO2019/186860 A1 | | 10/2019 |

* cited by examiner

FIG.25
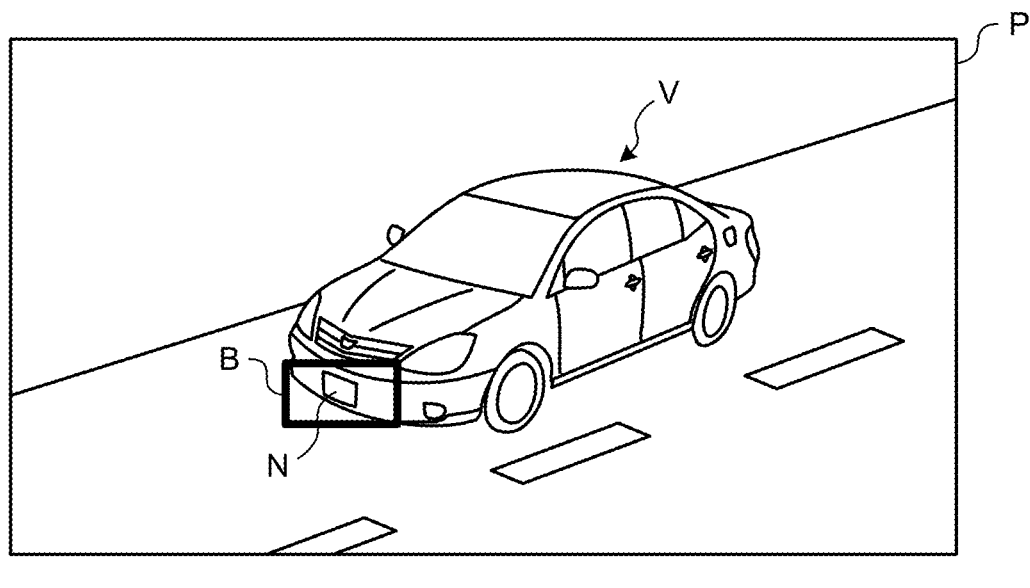
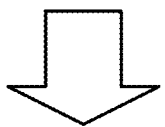
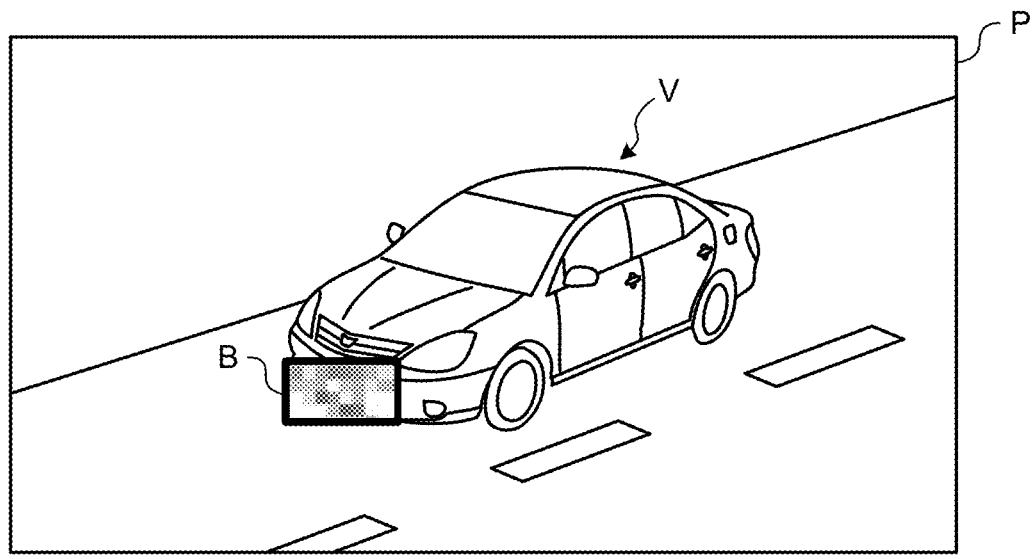

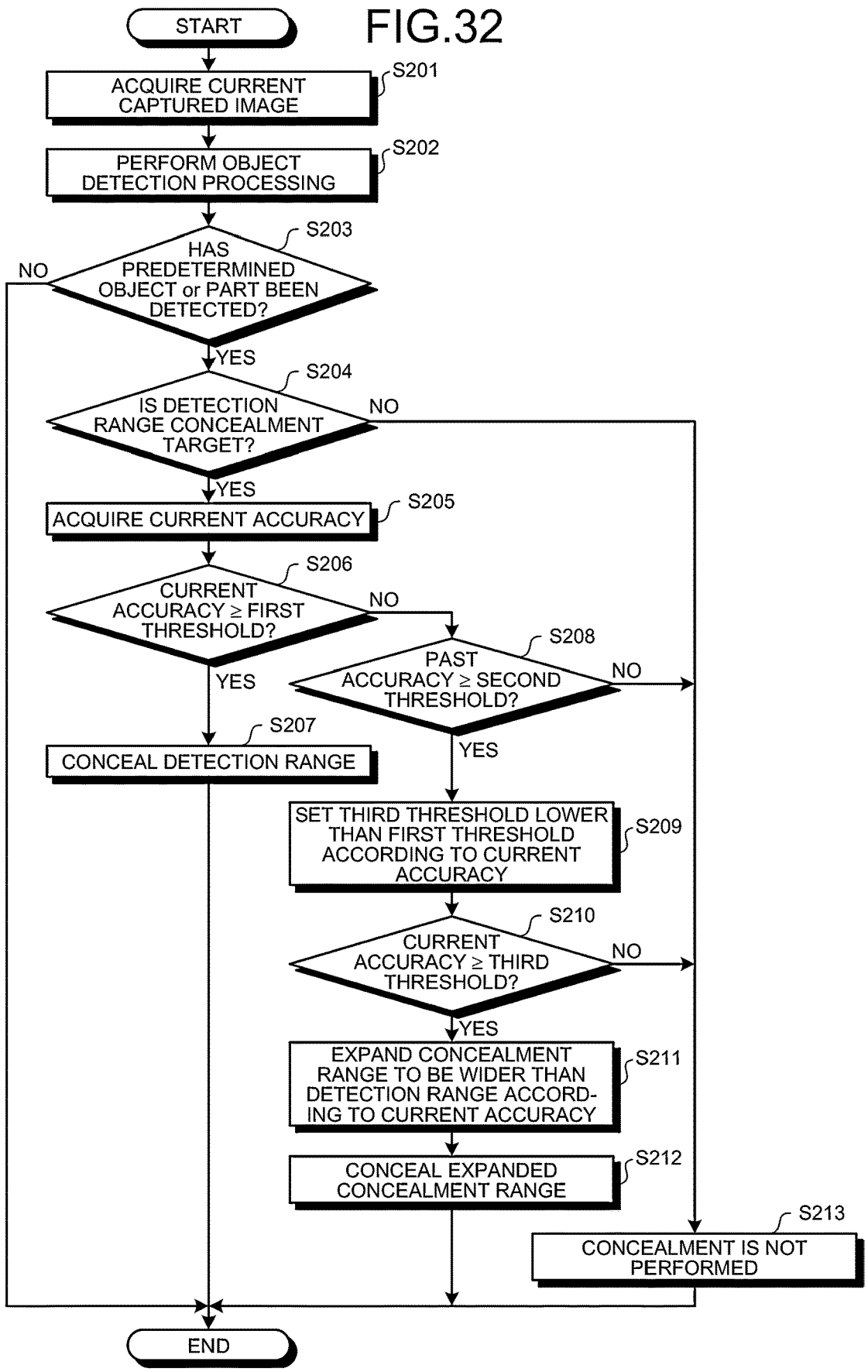

IMAGE PROCESSING DEVICE AND IMAGE PROCESSING METHOD

CROSS-REFERENCE TO RELATED APPLICATIONS

This application is national stage application of International Application No. PCT/JP2020/041622, filed on Nov. 6, 2020, which designates the United States, incorporated herein by reference, and which claims the benefit of priority from Japanese Patent Application No. 2019-203263, filed on Nov. 8, 2019; Japanese Patent Application No. 2019-203267, filed on Nov. 8, 2019; and Japanese Patent Application No. 2020-173513, filed on Oct. 14, 2020, the entire contents of all of which are incorporated herein by reference.

FIELD

The present invention relates to an image processing device and an image processing method.

BACKGROUND

Conventionally, a technology for detecting an object such as a person or a vehicle from an image captured by a camera has been known. In addition, a technology in which a vehicle is detected from an image captured by a camera, and a license plate is recognized according to a detection result has been known (see, for example, Patent Literature 1).

CITATION LIST

Patent Literature

Patent Literature 1: JP 2015-64752 A

SUMMARY

Technical Problem

By the way, for example, even in a case where a vehicle can be detected from an image captured by a camera, a license plate of the vehicle cannot be detected in some cases. In addition, for example, even in a case where a person can be detected from an image captured by a camera, a face of the person cannot be recognized in some cases. That is, even in a case where a certain object can be detected from an image captured by a camera, a part of the object cannot be detected in some cases.

Such a phenomenon is likely to occur, for example, when the part of the object is considerably small in relation to the entire object in the captured image. In a case of reducing a resolution of the captured image used for object detection in order to reduce a load of detection processing, a phenomenon that the part of the object cannot be detected although the object can be detected easily occurs.

Solution to Problem

An image processing device according to the present invention includes: a first detection unit that is configured to detect a predetermined object and a predetermined part of the predetermined object from an acquired captured image; a setting unit that sets a detection range in the captured image based on a detection result of the first detection unit in a case where only the predetermined object out of the predetermined object and the predetermined part has been detected by the first detection unit; and a second detection unit that attempts to detect the predetermined part in the detection range.

BRIEF DESCRIPTION OF DRAWINGS

FIG. 25 is a schematic explanatory diagram (Part 1) of an image processing method according to the sixth embodiment.

FIG. 32 is a flowchart illustrating an example of an operation of the image processing device according to a second modified example of the sixth embodiment.

DESCRIPTION OF EMBODIMENTS

Hereinafter, exemplary embodiments of the present invention will be described in detail with reference to the drawings.

1. First Embodiment 1-1. Configuration of Image Processing Device

Figure 1:
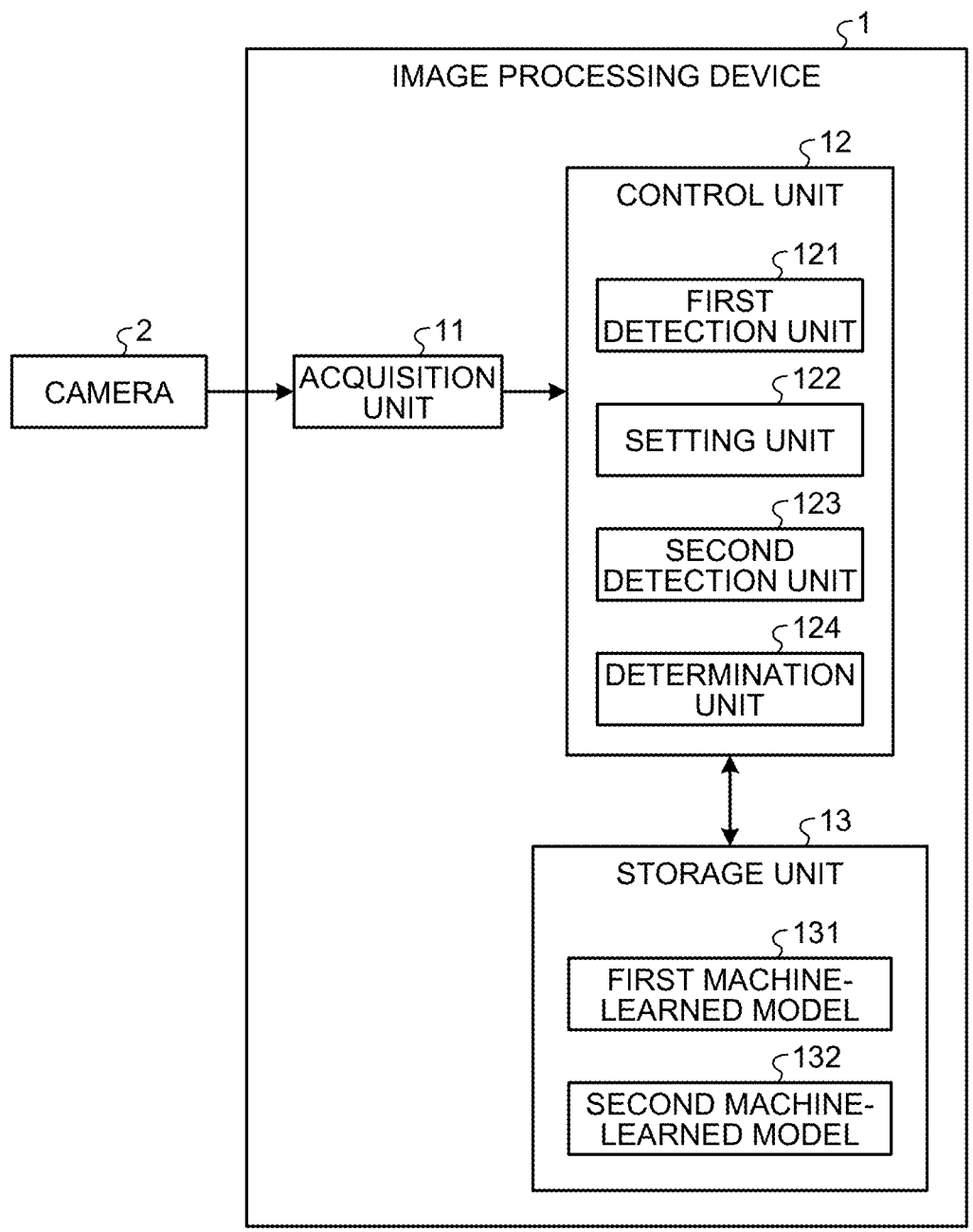
FIG. 1 is a diagram illustrating a configuration of an image processing device according to a first embodiment.

FIG. 1 is a diagram illustrating a configuration of an image processing device 1 according to a first embodiment of the present invention. Note that, in FIG. 1, only components necessary for describing features of the image processing device 1 of the first embodiment are illustrated, and a description of general components is omitted. FIG. 1 also illustrates a camera 2 which is a component separate from the image processing device 1 for easy understanding.

The image processing device 1 may be mounted on a mobile body such as a vehicle, for example. Examples of the vehicle widely include wheeled vehicles such as an automobile, a train, and an unmanned vehicle. The image processing device 1 may be included in, for example, an in-vehicle device such as a navigation device or a drive recorder mounted on the vehicle. The image processing device 1 does not have to mounted on the mobile body, and may be arranged in, for example, a monitoring facility provided in a commercial facility, a parking lot, or the like, or in a building such as a tollgate of an expressway. Furthermore, the image processing device 1 may be included in, for example, a server device such as a cloud server configured to perform communication with a terminal device such as an in-vehicle device via a network or the like. Furthermore, the image processing device 1 may be included in a mobile terminal such as a smartphone or a tablet PC, for example.

The camera 2 may be mounted on a mobile body such as a vehicle, or may be fixedly arranged outside a building such as a commercial facility or a parking lot. The camera 2 outputs an image which has been captured (a captured image) to the image processing device 1, for example, in a wired or wireless manner or by using a network.

As illustrated in FIG. 1, the image processing device 1 includes an acquisition unit 11, a control unit 12, and a storage unit 13.

The acquisition unit 11 acquires the captured image. For example, the acquisition unit 11 continuously acquires analog or digital captured images from the camera 2 mounted on the vehicle at a predetermined interval (for example, an interval of 1/30 seconds). An aggregate of the captured images acquired by the acquisition unit 11 is a moving image captured by the camera 2. In a case where the acquired captured image is an analog captured image, the acquisition unit 11 converts the analog captured image into a digital captured image (A/D conversion). The acquisition unit 11 outputs the acquired captured image (an image after conversion in a case where the A/D conversion is performed) to the control unit 12.

The control unit 12 is a controller that integrally controls the entire image processing device 1. The control unit 12 is implemented by a computer including, for example, a central processing unit (CPU) which is a hardware processor, a random access memory (RAM), a read only memory (ROM), and the like.

The storage unit 13 is implemented by, for example, a semiconductor memory element such as a RAM or a flash memory, a hard disk, or a storage device using a portable recording medium such as an optical disk, or the like. The storage unit 13 stores a program as firmware and various data. In the present embodiment, the storage unit 13 stores a first machine-learned model 131 and a second machine-learned model 132. Note that, for the first machine-learned model 131 and the second machine-learned model 132, an updated machine-learned model can be downloaded from, for example, a cloud server or the like by using wireless communication or the like. That is, the first machine-learned model 131 and the second machine-learned model 132 may be configured to be updatable.

The first machine-learned model 131 and the second machine-learned model 132 are obtained by performing learning using a machine learning algorithm such as a deep neural network (DNN). The first machine-learned model 131 and the second machine-learned model 132 may be obtained by, for example, supervised learning. In the present embodiment, the first machine-learned model 131 is used to detect a predetermined object and a predetermined part of the predetermined object. The second machine-learned model 132 is used to detect the predetermined part.

Examples of the predetermined object include a person and a vehicle. Note that the predetermined object may have a part understood as a part of a certain object, such as a face of a person or a front portion of a vehicle. The predetermined part is, for example, a face in a case where the predetermined object is a person. The predetermined part is, for example, a license plate or the like in a case where the predetermined object is a vehicle. The predetermined part is, for example, an eye in a case where the predetermined object is a face. Note that the predetermined object may have a plurality of predetermined parts. The predetermined object may include a plurality of types of objects. For example, the first machine-learned model 131 may be used to detect a person and a vehicle as the predetermined objects.

A first detection unit 121, a setting unit 122, a second detection unit 123, and a determination unit 124 illustrated in FIG. 1 are functions of the control unit 12 implemented by the CPU of the control unit 12 performing arithmetic processing according to a program stored in the storage unit 13. In other words, the image processing device 1 includes the first detection unit 121, the setting unit 122, the second detection unit 123, and the determination unit 124. Note that the control unit 12 does not have to include the determination unit 124.

At least one of the first detection unit 121, the setting unit 122, the second detection unit 123, or the determination unit 124 in the control unit 12 may be implemented by hardware such as an application specific integrated circuit (ASIC), a field programmable gate array (FPGA), or a graphics processing unit (GPU).

In addition, the first detection unit 121, the setting unit 122, the second detection unit 123, and the determination unit 124 are conceptual components. The functions executed by one component may be distributed to a plurality of components, or the functions of a plurality of components may be integrated into one component. In addition, the acquisition unit 11 may be implemented by the CPU of the control unit 12 performing arithmetic processing according to a program. Furthermore, for a specific hardware configuration of the image processing device 1, omission, replacement, or addition of components may be appropriately performed according to the embodiment. For example, the control unit 12 may include a plurality of hardware processors.

The first detection unit 121 is configured to detect the predetermined object and the predetermined part of the predetermined object from the acquired captured image. In the present embodiment, the first detection unit 121 uses the first machine-learned model 131 stored in the storage unit 13 to detect the predetermined object and the predetermined part of the predetermined object from the captured image. It is preferable that the first detection unit 121 performs object detection by the first machine-learned model 131 by using a low-resolution image obtained by reducing the resolution of the captured image acquired from the acquisition unit 11. By doing so, it is possible to reduce a processing load of the object detection processing in the first detection unit 121.

The first machine-learned model 131 is preferably configured to detect the predetermined object and the predetermined part by using the DNN. However, the first machine-learned model 131 may also be configured to detect the predetermined object and the predetermined part by using another machine learning algorithm such as a support vector machine (SVM) using a histogram of gradient (HOG) feature amount, for example.

Note that the first detection unit 121 may be configured to set a partial range of the captured image as a detection target region for which detection of a detection target object (the predetermined object and the predetermined part in the present embodiment) is to be performed, and perform the object detection processing using the first machine-learned model 131 only for the detection target region. With such a configuration, a processing amount of the object detection processing can be reduced. The detection target region may be set based on, for example, known attachment position information of the camera 2, a predetermined appropriate distance range from the camera 2 to the detection target, and the like.

Figure 2:
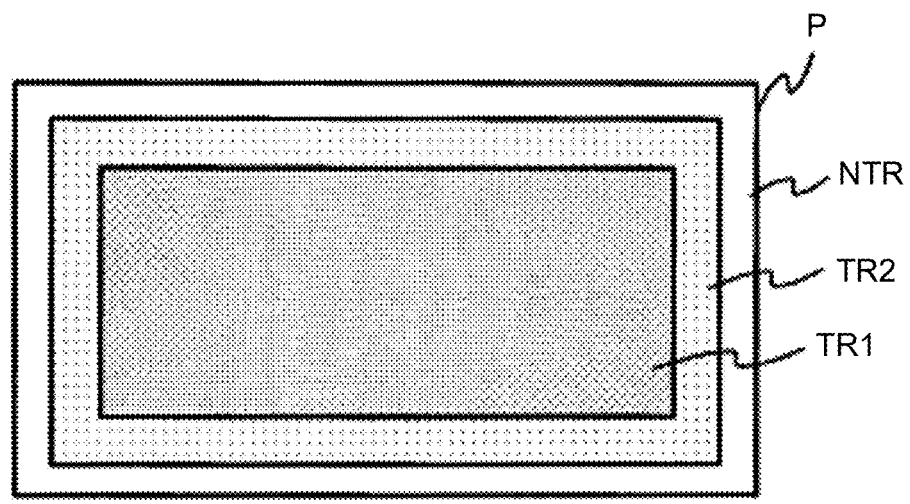
FIG. 2 is a diagram for describing a modified example of the image processing device of the first embodiment.

However, in a case where the detection target region is provided in the captured image, the information cannot be obtained when the object is present outside the detection target region. For this reason, as illustrated in FIG. 2, when the detection processing is performed by the first detection unit 121, a main detection target region (first region) TR1 that is provided for the purpose of detecting the detection target object and a sub-detection target region (second region) TR2 that is adjacent to the main detection target region TR1 and is provided for the purpose of complementing the detection processing for the main detection target region TR1 may be set in a captured image P. The sub-detection target region TR2 may be a region surrounding the main detection target region TR1.

The first detection unit 121 may be configured to perform different detection processing for each of the main detection target region TR1 and the sub-detection target region TR2. With such a configuration, it is possible to suppress a decrease in information regarding the detection target object while reducing the load of the object detection processing.

Specifically, for the main detection target region TR1, for example, the detection processing may be performed using a machine-learned model (a machine-learned model for classifying objects) similar to the first machine-learned model 131, and for the sub-detection target region TR2, the detection processing may be performed using a machine-learned model (obtained by machine learning) different from that for the main detection target region TR1. The detection processing performed for the sub-detection target region TR2 is processing with a light load as compared with the detection processing performed for the main detection target region TR1. For the sub-detection target region TR2, for example, image segmentation for labeling with a meaning for each pixel may be performed.

In the example illustrated in FIG. 2, a non-detection target region (third region) NTR which is adjacent to the sub-detection target region TR2 and for which the detection processing is not performed is set in the captured image P. The non-detection target region NTR may surround the sub-detection target region TR2, for example. The non-detection target region NTR does not have to be set, but the processing load of the first detection unit 121 can be further reduced by setting the non-detection target region NTR.

Referring back to FIG. 1, in a case where the first detection unit 121 detects only the predetermined object out of the predetermined object and the predetermined part, the setting unit 122 sets a detection range in the captured image based on the detection result of the first detection unit 121. The detection range is set to detect the predetermined part that has not been detected. The captured image in which the detection range is set may be a captured image obtained from the acquisition unit 11 or a captured image processed after being obtained from the acquisition unit 11. The processed captured image may be, for example, a captured image with a reduced resolution. For example, in a case where the first detection unit 121 has detected a person as the predetermined object but has not detected a face as the predetermined part, the setting unit 122 sets the detection range for detecting the face in the captured image based on the detection result of the first detection unit 121.

Specifically, the setting unit 122 sets, as the detection range, a region where it is highly likely that the predetermined part is present, in the region where the predetermined object is detected. As a result, the detection of the predetermined part can be attempted again in the region where the predetermined part is highly likely to be present, and the redetection processing for the predetermined part can be efficiently performed.

In the present embodiment, the first detection unit 121 can also acquire additional information such as an orientation, a posture, and a type of the predetermined object, for example, at the time of the object detection processing using the first machine-learned model 131. The acquisition of such additional information can be enabled by, for example, preparing a large amount of data for the additional information and performing supervised learning when machine learning for obtaining the first machine-learned model 131 is performed by a learning device.

For example, at the time of the object detection processing using the first machine-learned model 131, the first detection unit 121 also acquires additional information such as a posture, an orientation, or the like of the detected person. The setting unit 122 obtains a region where it is highly likely that the face of the person is present in the captured image by considering the additional information such as the posture in addition to position information of the person obtained by the detection processing performed by the first detection unit 121. Note that the storage unit 13 stores structuralization information of the person associated with the posture and orientation of the person, and the first detection unit 121 may also refer to the structuralization information of the person to obtain a region where it is highly likely that the face of the person is present. The setting unit 122 sets the obtained region as the detection range.

Note that, in a case where the predetermined part (for example, a face or a license plate) is detected by the detection processing performed by the first detection unit 121, the setting unit 122 does not perform the processing of setting the detection range because it is not necessary to perform the processing of detecting the predetermined part again. In addition, in a case where the predetermined object is not detected by the detection processing performed by the first detection unit 121, it is determined that the predetermined part is not present in the captured image, and thus, the setting unit 122 does not perform the processing of setting the detection range.

The second detection unit 123 attempts to detect the predetermined part in the detection range set by the setting unit 122. The detection processing performed by the second detection unit 123 is performed only when the detection range is set. That is, the detection processing performed by the second detection unit 123 is not performed in a case where the first detection unit 121 has not been able to detect the predetermined object and in a case where the first detection unit 121 has been able to detect the predetermined part.

In the present embodiment, the second detection unit 123 attempts to detect the predetermined part in the set detection range by using the second machine-learned model 132 stored in the storage unit 13. Note that the image used for the detection processing by the second detection unit 123 may be an image with the resolution as acquired from the acquisition unit 11. However, the image may be an image whose resolution is reduced after being acquired from the acquisition unit 11.

In the object detection processing performed by the second detection unit 123 using the second machine-learned model 132, only the predetermined part is detected. Therefore, the processing load of the object detection processing performed by the second detection unit 123 can be reduced. In the present embodiment, the processing load of the detection processing performed by the second detection unit 123 is smaller than that of the detection processing performed by the first detection unit 121. The second machine-learned model 132 may be configured to detect the predetermined part by using, for example, the DNN. However, the second machine-learned model 132 may also be configured to detect the predetermined part by using another machine learning algorithm such the SVM using the HOG feature amount, for example.

Note that the second detection unit 123 may be configured to detect the predetermined part by using another method such as template matching without using the second machine-learned model 132 obtained by machine learning.

According to the present embodiment, when the object has been able to be detected by the first detection unit 121, but the predetermined part of the object has not been able to be detected, the second detection unit 123 attempts to detect the predetermined part. For this reason, it is possible to reduce a possibility that the detection target (the predetermined object and the predetermined part of the predetermined object in the present embodiment) appearing in the captured image is not detected. In addition, since the range for which the second detection unit 123 performs the detection of the predetermined part is appropriately narrowed down to a partial range of the captured image by the setting unit 122, the second detection unit 123 can efficiently detect the predetermined part.

The determination unit 124 determines whether or not the detection of the predetermined object by the first detection unit 121 is false detection based on the detection result of the second detection unit 123. Specifically, in a case where the predetermined part has been able to be detected by the second detection unit 123, the determination unit 124 determines that the detection of the predetermined object by the first detection unit 121 is not false detection. In a case where the predetermined part has not been able to be detected by the second detection unit 123, the determination unit 124 determines that the detection of the predetermined object by the first detection unit 121 is false detection. As a result, it is possible to reduce a possibility that information with low reliability is output to the outside of the image processing device 1. Note that the range in which the object or the predetermined part of the object can be detected is set as, for example, a range in which concealment is performed by "concealment processing" as described later in fourth and subsequent embodiments. The concealment processing is processing of processing the captured image in order to protect personal information. In addition, for example, the range in which the object and the predetermined part of the object can be detected can be used for monitoring or sorting. As an example, the processing can be used for face authentication or the like at an automatic ticket gate, an airplane boarding gate, a counter of a financial institution, or the like, and processing for a recognition target can be changed between a case where individual identification is possible and a case where individual identification is not possible.

1-2. Example of Operation of Image Processing Device

Figure 3:
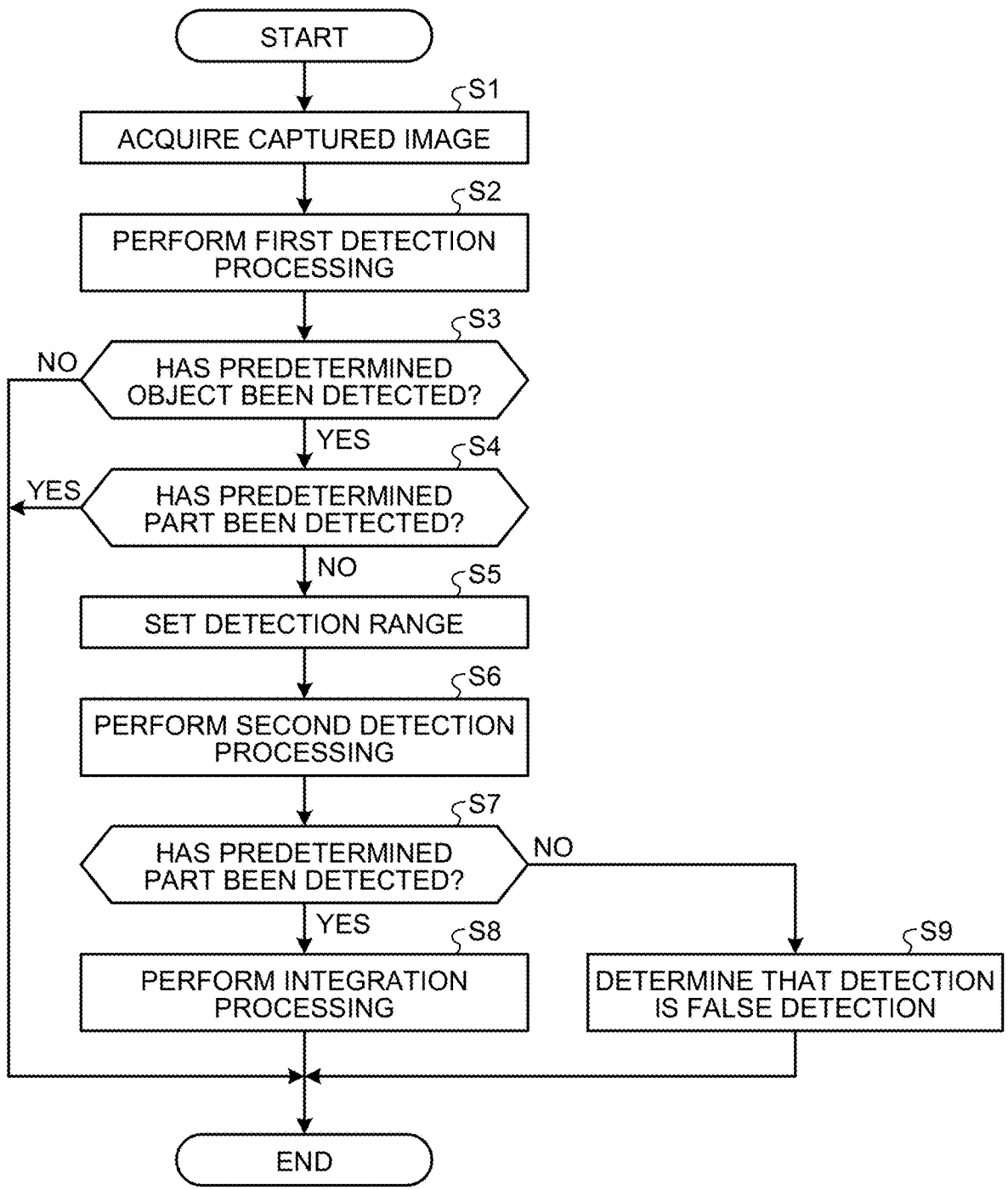
FIG. 3 is a flowchart illustrating an example of an operation of the image processing device according to the first embodiment.

FIG. 3 is a flowchart illustrating an example of an operation of the image processing device 1 according to the first embodiment of the present invention. Note that the image processing device 1 performs the operation of the flowchart illustrated in FIG. 3, for example, every time the captured image is acquired by the acquisition unit 11.

Figure 4:
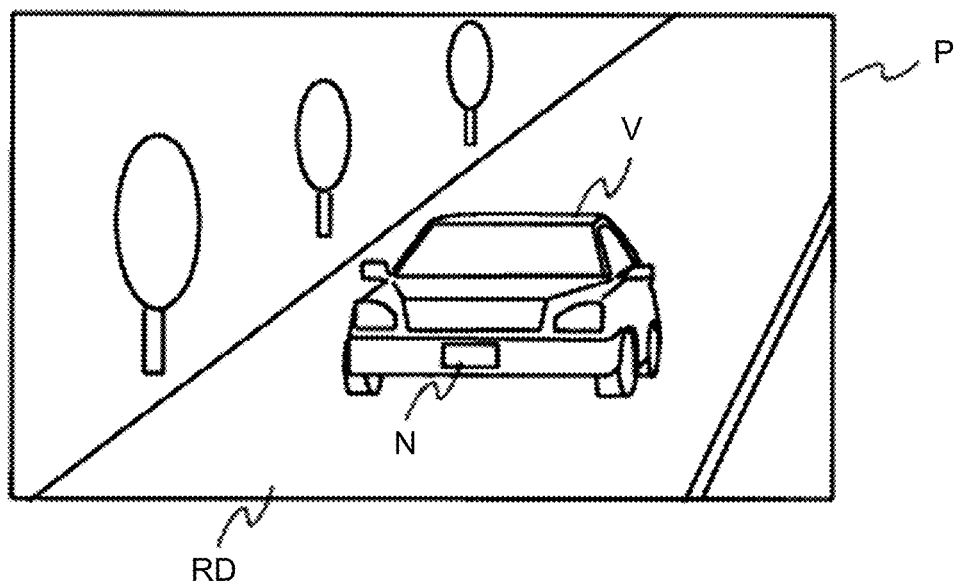
FIG. 4 is a diagram illustrating an example of a captured image acquired by an acquisition unit.

In Step S1, the acquisition unit 11 acquires the captured image from the camera 2. The acquisition unit 11 acquires the captured image P as illustrated in FIG. 4, for example. The captured image P illustrated in FIG. 4 shows a state in which one vehicle V is traveling on a road RD. A license plate N on the front side of the vehicle V is shown in the captured image P. Once the acquisition unit 11 acquires the captured image, the processing proceeds to the next Step S2.

In Step S2, object detection processing (first detection processing) is performed on the captured image acquired by the first detection unit 121. Specifically, the first detection unit 121 attempts to detect the predetermined object and the predetermined part of the predetermined object from the captured image by using the first machine-learned model 131. For example, in a case where the predetermined object is a vehicle and the predetermined part of the vehicle is a license plate, the first detection unit 121 attempts to detect the vehicle and the license plate included in the captured image. Once the first detection processing is completed, the processing proceeds to Step S3.

Figure 5:
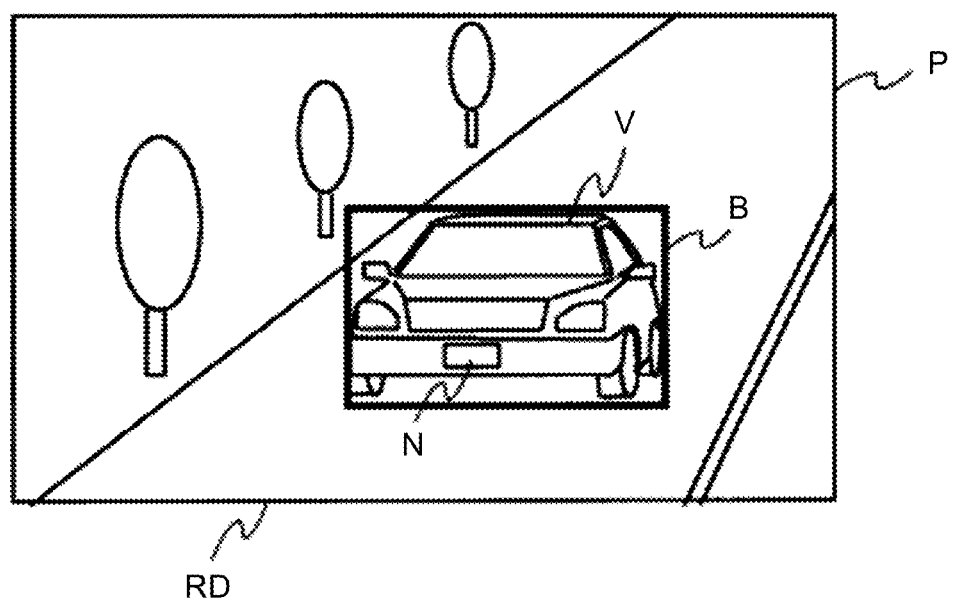
FIG. 5 is a diagram illustrating a detection result of a first detection unit for the captured image illustrated in FIG. 4.

FIG. 5 is a diagram illustrating a detection result of the first detection unit 121 for the captured image P illustrated in FIG. 4. In FIG. 5, a thick frame B is a bounding box. The first detection unit 121 completes classification of the object in the bounding box B. That is, in the example illustrated in FIG. 5, the first detection unit 121 can detect the vehicle V in the captured image (bounding box B), but cannot detect the license plate N, which is the predetermined part of the vehicle V.

In Step S3, the setting unit 122 checks whether or not the first detection unit 121 has detected the predetermined object. For example, in a case where the predetermined object is a vehicle, it is checked whether or not the vehicle has been detected from the captured image. In a case where it is determined that the predetermined object has been detected (Yes in Step S3), the processing proceeds to Step S4. On the other hand, in a case where it is determined that the predetermined object has not been detected (No in Step S3), the processing illustrated in the flowchart of FIG. 3 temporarily ends.

In the example illustrated in FIG. 5, the vehicle V that is the predetermined object can be detected. For this reason, in the example illustrated in FIG. 5, the processing proceeds to Step S4.

In Step S4, the setting unit 122 checks whether or not the first detection unit 121 has detected the predetermined part of the predetermined object. For example, in a case where the predetermined part is a license plate, it is checked whether or not the license plate has been detected from the captured image. In a case where it is determined that the predetermined part has been detected (Yes in Step S4), the processing illustrated in the flowchart in FIG. 3 temporarily ends. On the other hand, in a case where it is determined that the predetermined part has not been detected (No in Step S4), the processing proceeds to Step S5.

Note that, in a case where a plurality of predetermined objects has been detected in the processing of Step S2, it is checked whether or not the predetermined part has been detected for each predetermined object in Step S4. That is, it is determined whether or not the processing proceeds to Step S5 for each object detected by the first detection unit 121.

In the example illustrated in FIG. 5, the license plate N, which is the predetermined part of the vehicle V, is not detected by the first detection unit 121.

Therefore, in Step S4, it is determined that the processing proceeds to Step S5.

In Step S5, the setting unit 122 sets the detection range, which is the range for detecting the predetermined part, in the captured image. For example, in a case where the predetermined part that has not been detected is a license plate, the detection range is set in a region where it is determined that it is highly likely that the license plate is present, in the region where the vehicle has been detected. Once the setting of the detection range is completed, the processing proceeds to Step S6. Note that, in a case where there is a plurality of predetermined objects whose predetermined part has not been able to be detected, the detection range is set for each predetermined object.

Figure 6:
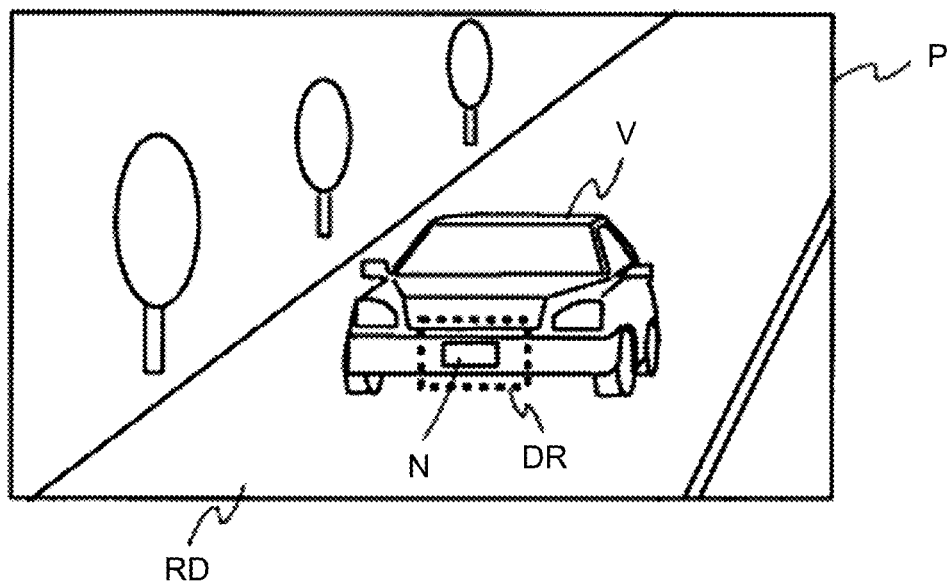
FIG. 6 is a diagram for describing processing performed by a setting unit in a case where the detection result illustrated in FIG. 5 is obtained by the first detection unit.

FIG. 6 is a diagram for describing processing performed by the setting unit 122 in a case where the detection result illustrated in FIG. 5 is obtained by the first detection unit 121. In FIG. 5, one vehicle V whose license plate N has not been able to be detected is detected by the first detection unit 121. Therefore, as illustrated in FIG. 6, the setting unit 122 sets a detection range DR for detecting the license plate N of one vehicle V detected by the first detection unit 121 in the captured image.

In this example, the first detection unit 121 can obtain additional information such as the orientation of the vehicle V and the type of the vehicle V, for example, in addition to the region where the vehicle V is present. The acquisition of such additional information is enabled by using, for example, a machine-learned model obtained by causing the DNN to perform supervised learning as described above. For example, the orientation of the vehicle V can be acquired by performing machine learning using a large amount of image data in which a state of a tire associated with the orientation of the vehicle V is different. For example, the type of the vehicle V can be acquired by performing machine learning using a large amount of image data associated with the type of the vehicle V such as a two-wheeled vehicle, a light automobile, a standard automobile, and a large automobile.

The setting unit 122 obtains a region where it is highly likely that the license plate N is present in the captured image by considering the additional information such as the orientation and type of the vehicle V in addition to position information of the vehicle V obtained by the detection processing performed by the first detection unit 121. When obtaining the region where it is highly likely that the license plate N is present, the setting unit 122 refers to the structuralization information indicating a relationship between the orientation and type of the vehicle V and the position of the license plate N, the structuralization information being stored in the storage unit 13.

In Step S6, the second detection unit 123 attempts to perform detection processing (second detection processing) for the predetermined part in the detection range set in the captured image. Specifically, the second detection unit 123 attempts to detect the predetermined part in the set detection range by using the second machine-learned model 132. For example, in a case where the predetermined part is a license plate, the second detection unit 123 attempts to detect the license plate included in the captured image. Once the second detection processing is completed, the processing proceeds to Step S7. Note that, in a case where a plurality of detection ranges is set in Step S5, the processing of detecting the predetermined part is performed for each detection range.

In the example illustrated in FIG. 6, an attempt is made to detect the license plate N in the detection range DR set in the captured image by using the second machine-learned model 132.

In Step S7, the determination unit 124 checks whether or not the predetermined part has been detected by the second detection processing in Step S6. In a case where the predetermined part has been detected (Yes in Step S7), the processing proceeds to Step S8. In a case where the predetermined part has not been detected (No in Step S7), the processing proceeds to Step S9. In a case where a plurality of detection ranges is set in Step S5, a result of the second detection processing for each detection range is checked, and it is determined which one of Step S8 and Step S9 the processing needs to proceed to, based on each checked result.

In Step S8, since the predetermined part has been detected, the determination unit 124 determines that the detection of the predetermined object by the first detection unit 121 is not false detection. Then, the determination unit 124 performs integration processing for a result of detecting the predetermined object by the first detection unit 121 and a result of detecting the predetermined part by the second detection unit 123. For example, the determination unit 124 generates an image in which both a bounding box indicating that the predetermined object has been detected and a bounding box indicating that the predetermined part has been detected are added to one captured image. Note that the integration processing is not necessarily performed. Once the processing of Step S8 is completed, the processing of the flowchart illustrated in FIG. 3 temporarily ends.

Figure 7:
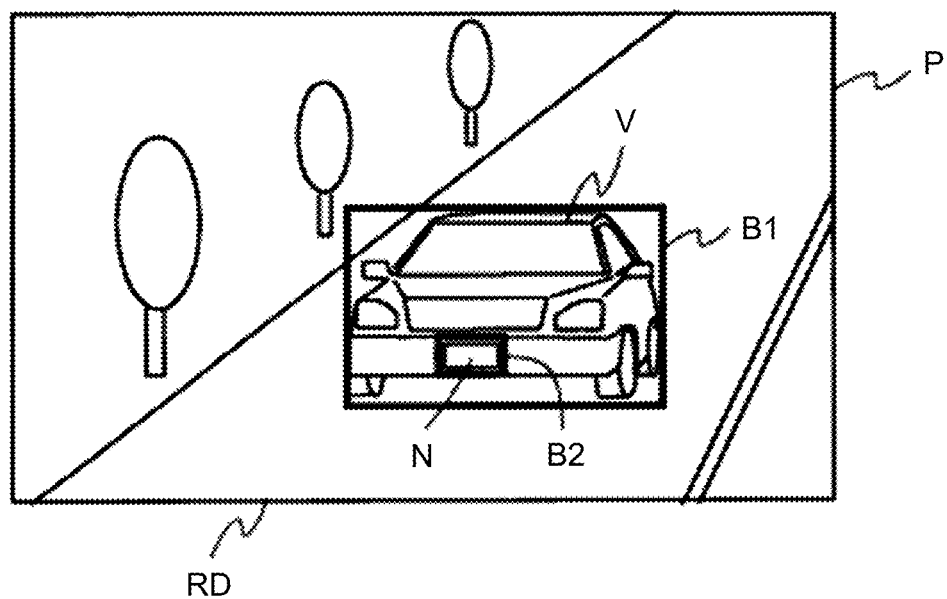
FIG. 7 is a diagram illustrating an image on which integration processing has been performed.

FIG. 7 is a diagram illustrating an image on which the integration processing has been performed. FIG. 7 is a diagram assuming that the license plate N has been detected as a result of performing the detection processing for the detection range DR illustrated in FIG. 6 by the second detection unit 123. As illustrated in FIG. 7, an image in which a bounding box B1 indicating detection of the vehicle V that is the predetermined object and a bounding box B2 indicating detection of the license plate N that is the predetermined part are added to one captured image P by the integration processing is generated.

In Step S9, since the predetermined part has not been detected, the determination unit 124 determines that the detection of the predetermined object by the first detection unit 121 is false detection. A result of the detection performed by the first detection unit 121 that is determined as false detection is prohibited from being output to the outside. Once the processing of Step S9 is completed, the processing of the flowchart illustrated in FIG. 3 temporarily ends.

2. Second Embodiment

Next, an image processing device according to a second embodiment will be described. In a description of the image processing device of the second embodiment, a description of portions overlapping with the first embodiment will be omitted unless it is particularly necessary to describe the portions.

2-1. Configuration of Image Processing Device

Figure 8:
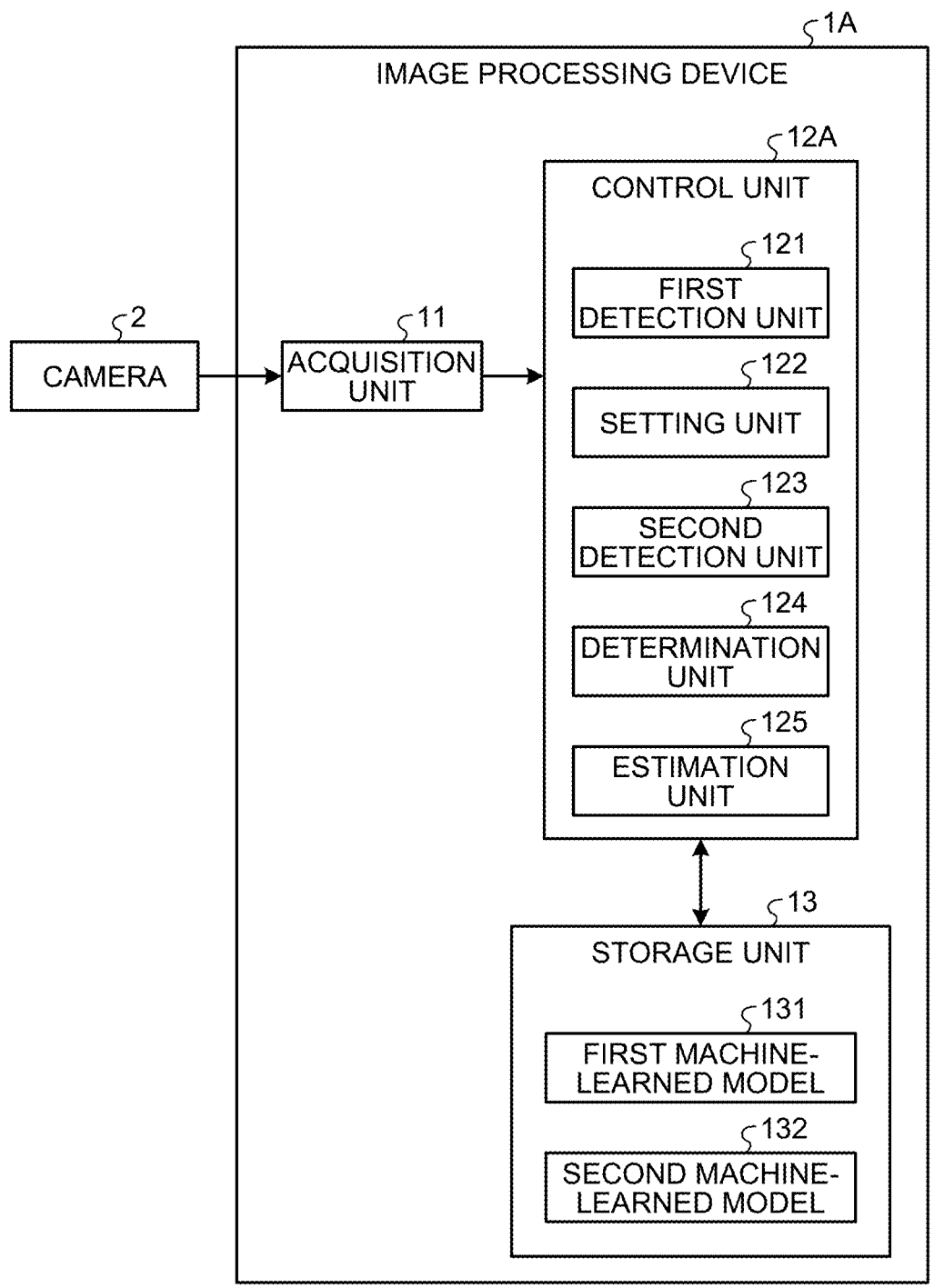
FIG. 8 is a diagram illustrating a configuration of an image processing device according to a second embodiment.

FIG. 8 is a diagram illustrating a configuration of an image processing device 1A according to the second embodiment of the present invention. Note that, in FIG. 8, only components necessary for describing features of the image processing device 1A of the second embodiment are illustrated, and a description of general components is omitted. FIG. 8 also illustrates the camera 2 which is a component separate from the image processing device 1A for easy understanding. Note that the camera 2 is mounted on a vehicle in the present embodiment. That is, in the present embodiment, the captured image is an image captured by the camera 2 mounted on the vehicle. Specifically, the captured image is an image of the periphery of the vehicle captured by the camera 2 mounted on the vehicle.

As illustrated in FIG. 8, the image processing device 1A includes an acquisition unit 11, a control unit 12A, and a storage unit 13. Since the acquisition unit 11 and the storage unit 13 are similar to those of the first embodiment, a description thereof will be omitted.

Similarly to the first embodiment, the control unit 12A is a controller that integrally controls the entire image processing device 1A. The control unit 12A is implemented by a computer including, for example, a CPU, a RAM, a ROM, and the like. However, the control unit 12A has a function different from that of the first embodiment. A first detection unit 121, a setting unit 122, a second detection unit 123, a determination unit 124, and an estimation unit 125 illustrated in FIG. 8 are functions of the control unit 12A implemented by the CPU of the control unit 12A performing arithmetic processing according to a program stored in the storage unit 13. In other words, the image processing device 1A includes the first detection unit 121, the setting unit 122, the second detection unit 123, the determination unit 124, and the estimation unit 125.

Note that at least one of the respective units 121 to 125 of the control unit 12A may be implemented by hardware such as an ASIC, an FPGA, or a GPU. The respective units 121 to 125 are conceptual components. The functions executed by one component may be distributed to a plurality of components, or the functions of a plurality of components may be integrated into one component. In addition, among the respective units 121 to 125, at least one of the setting unit 122, the second detection unit 123, or the determination unit 124 may be appropriately omitted.

The configurations of the first detection unit 121, the setting unit 122, the second detection unit 123, and the determination unit 124 are similar to those of the first embodiment, and thus a description thereof will be omitted. Note that, in a case where the control unit 12A does not include, for example, the setting unit 122, the second detection unit 123, and the determination unit 124, the first detection unit 121 may simply be configured to detect the predetermined object by using a machine-learned model that has been trained by machine learning.

The estimation unit 125 estimates a travel environment of the vehicle. Here, the vehicle is a vehicle on which the camera 2 is mounted. Examples of the travel environment of the vehicle include a distance to an object (for example, a peripheral vehicle, a person, a stationary object, or the like) present around the vehicle, brightness around the vehicle, a situation of a road on which the vehicle travels, a type of the road on which the vehicle travels (a general road, an expressway, or the like), a driving mode (automatic driving), and the like. The estimation unit 125 estimates the travel environment based on, for example, information acquired from various sensors, devices, and the like provided in the vehicle.

Examples of the various sensors include a radar, laser imaging detection and ranging (LIDAR), an ultrasonic sensor, a speed sensor, a steering angle sensor, a global positioning system (GPS), and the like. The various sensors may also include the camera 2. The various devices may include, for example, a device capable of obtaining information (road information or the like) by communication with an external device such as a navigation device. For example, the distance to an object present around the vehicle can be acquired from the radar, the LIDAR, the ultrasonic sensor, the camera 2, or the like.

In the image processing device 1A of the present embodiment, the resolution of the captured image used for the detection processing performed by the first detection unit 121 is adjusted based on the travel environment. The resolution of the captured image is adjusted by, for example, the first detection unit 121 or a newly provided resolution adjustment unit. The resolution of the captured image used in the detection processing performed by the first detection unit 121 is reduced from the resolution of the captured image acquired by the acquisition unit 11. The degree of reduction in resolution is adjusted based on the travel environment estimated by the estimation unit 125.

The degree of reduction in resolution is different between the first case where it is determined based on the travel environment that an object detection accuracy is prioritized over a processing time required for the object detection and the second case where it is determined based on the travel environment that the processing time is prioritized over the detection accuracy. Specifically, in the first case, the degree of reduction in resolution is lower than that in the second case. That is, the resolution of the captured image input to the first machine-learned model 131 is higher in the first case than in the second case.

For example, in a case where the distance to an object present around the vehicle is long, it is desirable that there is a margin for processing time and the object detection accuracy is high. On the other hand, in a case where the distance to an object present around the vehicle is short, it is desirable that there is no margin for processing time, and the object is detected in a short time. Therefore, in a case where the estimation unit 125 determines that the distance to an object is equal to or shorter than a predetermined distance (corresponding to the second case), the resolution of the captured image input to the first machine-learned model 131 is reduced as compared with a case where the estimation unit 125 determines that the distance to an object is longer than the predetermined distance (corresponding to the first case).

As in the present embodiment, when the resolution of the captured image used for the object detection performed by the first detection unit 121 is reduced to be lower than the resolution of the captured image acquired by the acquisition unit 11, the processing load of the first detection unit 121 can be reduced. In the present embodiment, the degree of reduction in resolution of the captured image is adjusted according to the travel environment, and the resolution of the captured image used for the object detection performed by the first detection unit 121 is not simply reduced. According to the present embodiment, it is possible to perform appropriate object detection processing that appropriately suppresses a decrease in detection accuracy while appropriately reducing a processing amount in the object detection.

2-2. Example of Operation of Image Processing Device

Figure 9:
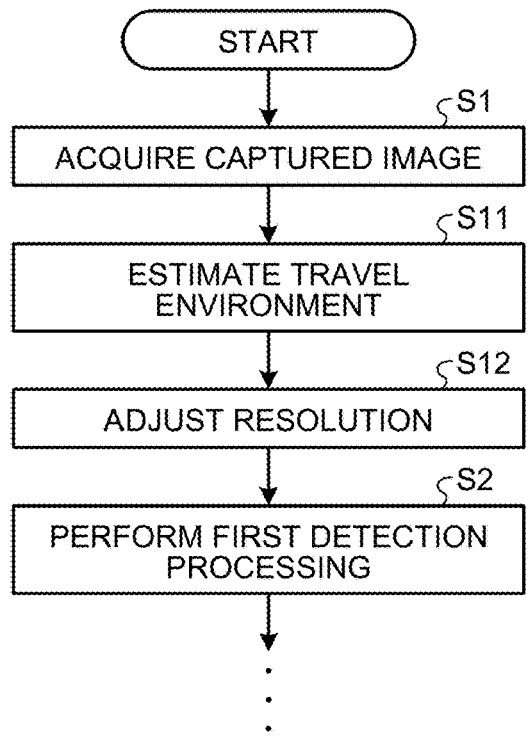
FIG. 9 is a flowchart illustrating an example of an operation of the image processing device according to the second embodiment.

FIG. 9 is a flowchart illustrating an example of an operation of the image processing device 1A according to the second embodiment of the present invention. The example of the operation illustrated in FIG. 9 is substantially similar to the example of the operation of the image processing device 1 of the first embodiment (see FIG. 3). In FIG. 9, some processings (processing after Step S2) similar to those in FIG. 3 are omitted. In the example of the operation illustrated in FIG. 9, the processing of Step S11 and the processing of Step S12 are performed between the processing of Step S1 and the processing of Step S2 of the example of the operation illustrated in FIG. 3, which is different from the first embodiment. The processing of this different part will be described below.

In Step S11, the travel environment of the vehicle on which the camera 2 is mounted is estimated by the estimation unit 125. Once the travel environment is estimated, the processing proceeds to the next Step S12. Note that, in this example, the processing of Step S11 is performed after the processing of Step S1 (image acquisition processing), but the processing of Step S11 may be performed in parallel with the processing of Step S1, for example.

In Step S12, resolution adjustment processing for the captured image acquired by the acquisition unit 11 is performed using a travel environment estimation result obtained by the estimation unit 125. In the present example, the resolution adjustment processing is processing of adjusting the degree of reduction in resolution. Once the processing of Step S12 is completed, the processing proceeds to Step S2, and first object detection processing is performed using the captured image whose resolution has been adjusted. Since the subsequent processing is similar to that of the first embodiment, a description thereof will be omitted.

3. Third Embodiment

Next, an image processing device according to a third embodiment will be described. In a description of the image processing device of the third embodiment, a description of portions overlapping with the first embodiment and the second embodiment will be omitted unless it is particularly necessary to describe the portions.

3-1. Configuration of Image Processing Device

A configuration of the image processing device of the third embodiment is similar to the configuration of the image processing device of the second embodiment. The image processing device of the third embodiment also includes an estimation unit 125. However, the way of using an estimation result of the estimation unit 125 is different. Hereinafter, this difference will be described. Note that, also in the third embodiment, the camera 2 is mounted on a vehicle, and the captured image is an image captured by the camera 2 mounted on the vehicle. Specifically, the captured image is an image of the periphery of the vehicle captured by the camera 2 mounted on the vehicle.

In the third embodiment, a first detection unit 121 changes detection processing of detecting the predetermined object and the predetermined part of the predetermined object based on the travel environment estimated by the estimation unit 125. When the travel environment is different, a tendency of an element appearing in the captured image is changed. For example, there is a tendency that the number of elements appearing in the captured image during urban driving is larger than the number of elements appearing in the captured image during expressway driving. As in the present embodiment, the object detection processing is changed depending on the travel environment, such that it is possible to appropriately set a condition for the object detection processing and to suppress a time required for the object detection from becoming excessively long or suppress the object detection accuracy from being degraded.

Similarly to the first embodiment and the second embodiment, in the image processing device of the third embodiment, the first detection unit 121 is configured to detect the predetermined object and the predetermined part of the predetermined object by using a machine-learned model generated by machine learning. However, in the third embodiment, the first detection unit 121 does not use only one first machine-learned model 131 stored in a storage unit 13.

The first detection unit 121 changes the machine-learned model to be used based on the travel environment estimated by the estimation unit 125. That is, in the present embodiment, the storage unit 13 stores a plurality of machine-learned models that is selectively used instead of the first machine-learned model 131 by the first detection unit 121 according to the travel environment. The number of the plurality of machine-learned models to be selectively used according to the travel environment may be two or more, and the number may be appropriately changed. According to the present embodiment, the object detection can be performed using an appropriate machine-learned model according to the travel environment, the time required for the detection processing can be shortened, and the degradation of the detection accuracy can be suppressed.

Note that the plurality of machine-learned models to be selectively used according to the travel environment does not have to be stored in advance in the storage unit 13. For example, the plurality of machine-learned models may be downloaded from a device capable of performing communication via a network, such as a server device, as necessary. In this case, in an initial state, the storage unit 13 may be configured not to store any machine-learned model to be used by the first detection unit 121, or may be configured to store at least one machine-learned model to be used by the first detection unit 121. Furthermore, in the configuration in which the machine-learned model is downloaded, for example, at least some of the machine-learned models already stored in the storage unit 13 may be deleted each time the download is executed.

3-2. Example of Operation of Image Processing Device

Figure 10:
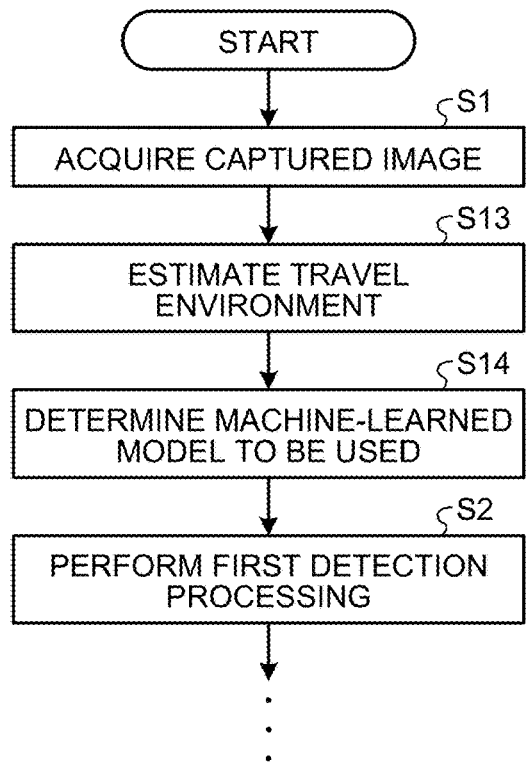
FIG. 10 is a flowchart illustrating an example of an operation of an image processing device according to a third embodiment.

FIG. 10 is a flowchart illustrating an example of an operation of the image processing device according to the third embodiment of the present invention. The example of the operation illustrated in FIG. 10 is substantially similar to the example of the operation of the image processing device 1 of the first embodiment (see FIG. 3). In FIG. 10, some processings (processing after Step S2) similar to those in FIG. 3 are omitted. In the example of the operation illustrated in FIG. 10, the processing of Step S13 and the processing of Step S14 are performed between the processing of Step S1 and the processing of Step S2 of the example of the operation illustrated in FIG. 3, which is different from the first embodiment. The processing of this different part will be described below.

In Step S13, the travel environment of the vehicle on which the camera 2 is mounted is estimated by the estimation unit 125. Once the travel environment is estimated, the processing proceeds to the next Step S12. Note that, in this example, the processing of Step S13 is performed after the processing of Step S1 (image acquisition processing), but the processing of Step S13 may be performed in parallel with the processing of Step S1, for example.

In Step S14, the machine-learned model to be used by the first detection unit 121 to detect the predetermined object and the predetermined part of the predetermined object is determined by using the travel environment estimation result obtained by the estimation unit 125. Once the processing of Step S14 is completed, the processing proceeds to Step S2, and the first detection unit 121 performs the first object detection processing by using the previously determined machine-learned model. In a case where it is necessary to download the machine-learned model from the outside, the download is executed before the first object detection processing. Since the processing after the first object detection processing in Step S2 is similar to that of the first embodiment, a description thereof will be omitted.

4. Fourth Embodiment

Meanwhile, there is a case where it is necessary to protect privacy related to the object detected in the captured image and the predetermined part of the object. As a technology for protecting privacy, "concealment processing" is known. The concealment processing is processing of processing the captured image in order to protect personal information.

However, when a feature of a target object cannot be detected, due to, for example, a small size of the target object desired to be detected in the captured image, detection of the detection target object may fail. When the detection of the target object such as a face that can identify an individual fails, there is a possibility that the concealment processing for concealing the face or the like fails.

In addition, in a case where a range in which the concealment is performed in the captured image is excessively wide, information that can be extracted from the captured image is decreased. For this reason, it is desirable to avoid excessive concealment of the captured image.

Furthermore, in a case where a subject such as a person is recognized from an image by using a learning model obtained by machine learning, a recognition probability thereof, in other words, a detection accuracy indicating the degree of certainty of detection may be decreased instantaneously or intermittently in time series due to, for example, an influence of noise mixed in the image.

Then, a subject with a low detection accuracy is determined not to be a target of the concealment, and although being instantaneous or intermittent, the concealment is not made. Therefore, there is a possibility that privacy is not protected.

In a fourth embodiment and fifth and sixth embodiments to be described later, regarding such points, a configuration for appropriately performing the concealment processing on the captured image to protect personal information will be described. Note that, in the following description, it is assumed that the predetermined object and the predetermined part are an object having a specific part that needs to be concealed to protect personal information and the specific part.

4-0. Personal Information Protection System

Figure 11:
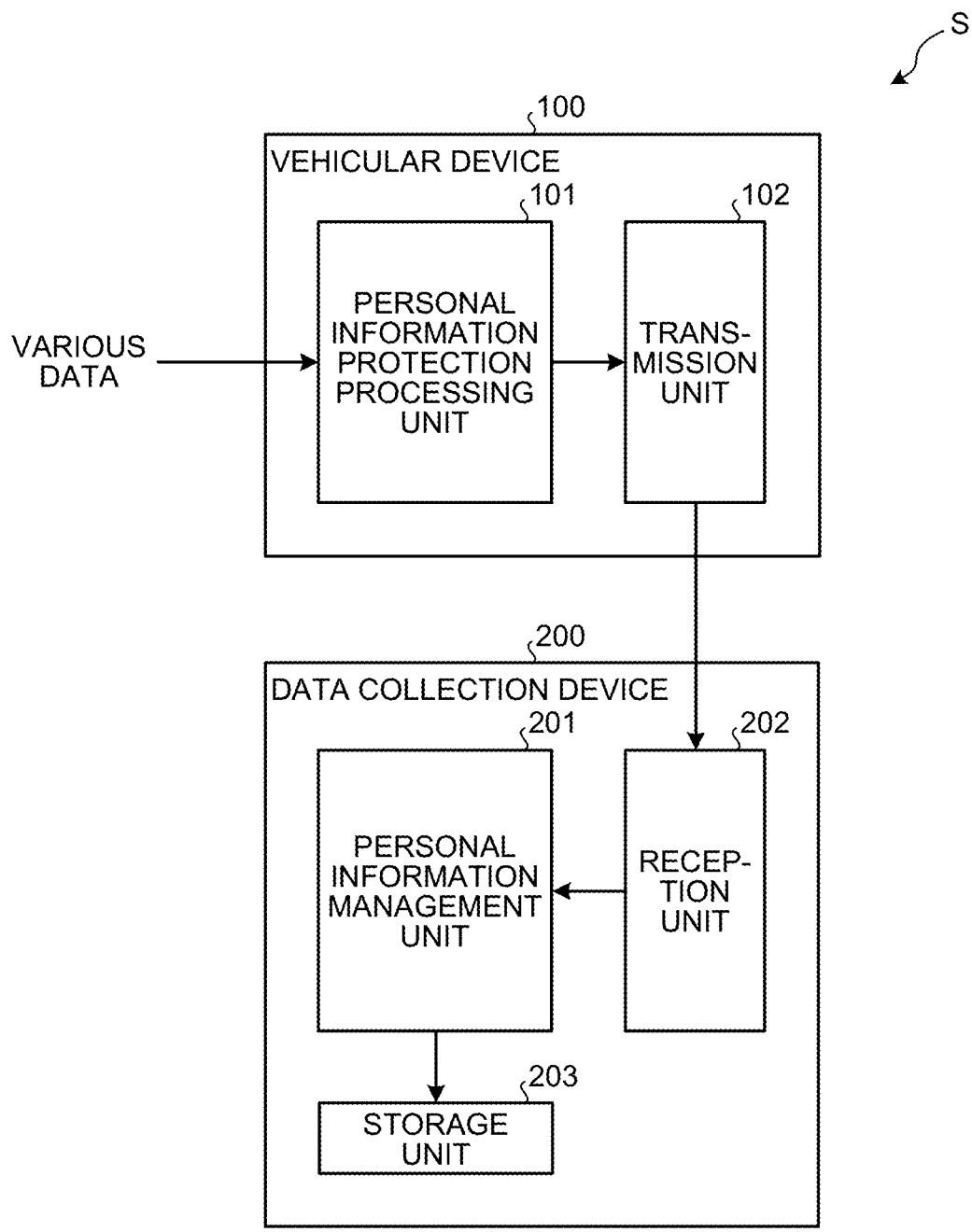
FIG. 11 is a diagram illustrating a configuration of a personal information protection system according to fourth to sixth embodiments.

FIG. 11 is a diagram illustrating a configuration of a personal information protection system S according to the fourth to sixth embodiments of the present invention. The personal information protection system S includes a vehicular device 100 and a data collection device 200.

The vehicular device 100 is a terminal device used by being mounted on a vehicle. The vehicle is, for example, a wheeled vehicle such as an automobile, a motorcycle, a train, and an unmanned vehicle. Various sensors including a camera are mounted on the vehicle. The vehicular device 100 acquires various data from the various sensors. Examples of the various data may include a speed of the vehicle, a position of the vehicle, a time at which the vehicle passes a specific position, and the like, in addition to the captured image captured by the camera.

Note that, for example, a drive recorder or a navigation device may also be used as the vehicular device 100. However, the vehicular device 100 may be a device different from the drive recorder and the navigation device. Furthermore, the vehicular device 100 may be an in-vehicle device or a mobile terminal that can be carried by an occupant of the vehicle. In a case where the vehicular device 100 is a mobile terminal, the vehicular device 100 may be, for example, a smartphone, a tablet PC, or the like.

The data collection device 200 is configured to perform communication with the vehicular device 100 via a network (not illustrated) such as the Internet or a mobile phone network. The data collection device 200 is implemented by, for example, a cloud server that provides a cloud service via a network. The data collection device 200 receives a data collection request from a data user (not illustrated) and provides data collected from the vehicular device 100 to the data user based on the received collection request. Note that the data collection device 200 is usually configured to perform communication with a plurality of vehicular devices 100, and collects data from each vehicular device 100.

As illustrated in FIG. 11, the vehicular device 100 includes a personal information protection processing unit 101. The personal information protection processing unit 101 performs protection processing on personal information included in the data obtained from various sensors mounted on the vehicle to prevent an individual from being identified. The vehicular device 100 appropriately performs the protection processing for protecting the personal information on various data and transmits the data subjected to the protection processing to the data collection device 200.

Note that the personal information is, in principle, information that can identify a specific individual, but in the present specification, the personal information may be used synonymously with privacy. Examples of the personal information include a face of a person, a license plate of a vehicle, a point name sign that can specify a place where the vehicle passes, and the like included in the captured image captured by the camera. Furthermore, the personal information is not limited to information included in the captured image, and may include a vehicle identification number (VIN), various times, and the like. The personal information may include both or only one of personal information regarding an occupant of the vehicle on which the vehicular device 100 is mounted and personal information regarding a person present outside the vehicle on which the vehicular device 100 is mounted.

Examples of a method of protecting the personal information by the personal information protection processing unit 101 include the "concealment processing" such as processing of reducing the resolution of the captured image, processing of encrypting the entire or a part of the captured image, processing of encrypting characters and numerical data, and processing of masking all unnecessary information (including the personal information) in the captured image. Note that, in a case where encryption is performed, it is preferable that decryption can be performed by the data collection device 200.

In the present embodiment, the personal information protection processing unit 101 performs, on the acquired captured image, the protection processing for protecting the personal information by image processing devices 3, 3A, and 5 (see FIGS. 12, 18, and 28) to be described later included in the vehicular device 100. The personal information protection processing unit 101 encrypts, by encryption means, the personal information detected from an image other than the captured image such as the vehicle identification number. The vehicular device 100 transmits data subjected to the protection processing by the personal information protection processing unit 101 to the data collection device 200 via a transmission unit 102.

As illustrated in FIG. 11, the data collection device 200 includes a personal information management unit 201. The personal information management unit 201 acquires various data via a reception unit 202 that receives data from the transmission unit 102 of the vehicular device 100, and manages the personal information of the various data. The personal information management unit 201 processes the acquired data in such a manner as not to identify an individual, and stores the processed data in a storage unit 203. The data stored in the storage unit 203 is used by the above-described data user.

Note that, in the present embodiment, the protection processing for protecting the personal information is performed in the vehicular device 100, but the present invention is not limited thereto, and the protection processing for protecting the personal information may be performed by the data collection device 200. In this case, the image processing devices 3, 3A, and 5 to be described later are included in the data collection device 200. However, the image processing devices 3, 3A, and 5 that perform processing of protecting the personal information are preferably included in the vehicular device 100 that transmits data, instead of the data collection device 200 configured as a server. Furthermore, a device that transmits data to the data collection device 200 does not have to be the vehicular device 100 and may be, for example, a terminal device or the like installed in a commercial facility, a station, a parking lot, or the like provided with a monitoring camera.

4-1. Configuration of Image Processing Device

Figure 12:
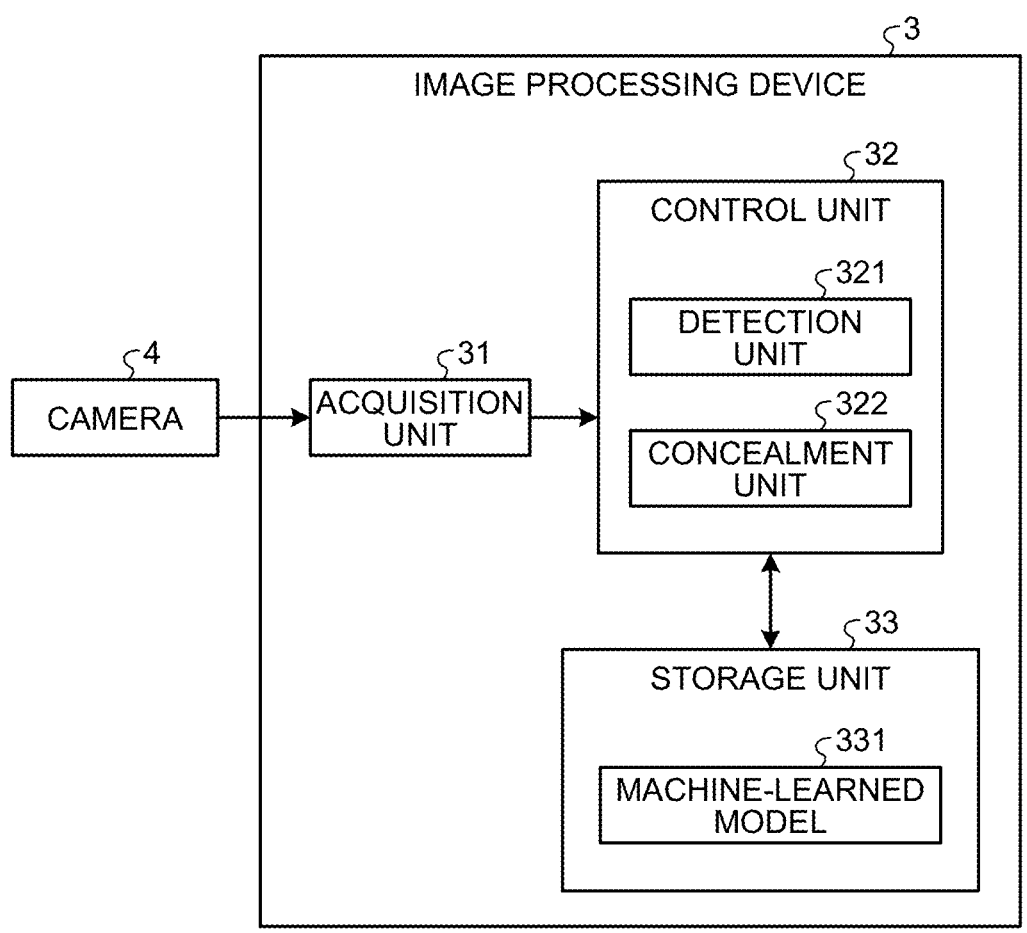
FIG. 12 is a diagram illustrating a configuration of an image processing device according to the fourth embodiment.

FIG. 12 is a diagram illustrating a configuration of the image processing device 3 according to the fourth embodiment of the present invention. Note that, in FIG. 12, only components necessary for describing features of the image processing device 3 of the fourth embodiment are illustrated, and a description of general components is omitted. FIG. 12 also illustrates a camera 4 which is a component separate from the image processing device 3 for easy understanding. As illustrated in FIG. 12, the image processing device 3 includes an acquisition unit 31, a control unit 32, and a storage unit 33.

The acquisition unit 31 acquires the captured image. In the present embodiment, the acquisition unit 31 continuously acquires analog or digital captured images from the camera 4 mounted on the vehicle at a predetermined interval (for example, an interval of 1/30 seconds). An aggregate of the captured images acquired by the acquisition unit 31 is a moving image captured by the camera 4. In a case where the acquired captured image is an analog captured image, the acquisition unit 31 converts the analog captured image into a digital captured image (A/D conversion). The acquisition unit 31 outputs the acquired captured image (an image after conversion in a case where the A/D conversion is performed) to the control unit 32.

Note that the camera 4 is, for example, a camera that monitors an area surrounding the vehicle, such as areas in front of and behind the vehicle. However, the camera 4 may be, for example, a camera that captures an image of the interior of the vehicle.

The control unit 32 is a controller that integrally controls the entire image processing device 3. The control unit 32 is implemented by a computer including, for example, a CPU which is a hardware processor, a RAM, a ROM, and the like.

The storage unit 33 is implemented by, for example, a semiconductor memory element such as a RAM or a flash memory, a hard disk, or a storage device using a portable recording medium such as an optical disk, or the like. The storage unit 33 stores a program as firmware and various data. In the present embodiment, the storage unit 33 stores a machine-learned model 331 that enables object detection. The machine-learned model 331 is obtained by performing learning by a machine learning algorithm such as the DNN. The machine-learned model 331 may be obtained by supervised learning, for example.

A detection unit 321 and a concealment unit 322 illustrated in FIG. 12 are functions of the control unit 32 implemented by the CPU of the control unit 32 performing arithmetic processing according to a program stored in the storage unit 33. In other words, the image processing device 3 includes the detection unit 321 and the concealment unit 322. The detection unit 321 corresponds to the first detection unit 121, the setting unit 122, and the second detection unit 123.

Note that at least one of the detection unit 321 or the concealment unit 322 of the control unit 32 may be implemented by hardware such as an ASIC, an FPGA, or a GPU. In addition, the detection unit 321 and the concealment unit 322 are conceptual components. The functions executed by one component may be distributed to a plurality of components, or the functions of a plurality of components may be integrated into one component. In addition, the acquisition unit 31 may be implemented by the CPU of the control unit 32 performing arithmetic processing according to a program. Furthermore, for a specific hardware configuration of the image processing device 3, omission, replacement, or addition of components may be appropriately performed according to the embodiment. For example, the control unit 32 may include a plurality of hardware processors.

The detection unit 321 is configured to detect an object having a specific part that needs to be concealed to protect the personal information and the above-described specific part from the acquired captured image. In the present embodiment, the detection unit 321 detects a predetermined object having a specific part that needs to be concealed and the specific part of the predetermined object from the captured image by using the machine-learned model 331 stored in the storage unit 33. It is preferable that the detection unit 321 performs object detection by the machine-learned model 331 by using a low-resolution image obtained by reducing the resolution of the captured image acquired from the acquisition unit 31. By doing so, it is possible to reduce a processing load of the object detection processing in the detection unit 321.

Examples of the predetermined object include a person, a vehicle such as an automobile, and a point name sign and the like specifying a place near a traffic light and the like. The specific part is a part that can specify a specific individual or can be used to estimate privacy of an individual. In a case where the predetermined object is a person, the specific part is, for example, a face. In a case where the predetermined object is a vehicle, the specific part is, for example, a license plate. In a case where the predetermined object is a point name sign, the specific part is, for example, a character part of the sign. Note that the predetermined object may have a plurality of specific parts. The predetermined object may include a plurality of types of objects. The predetermined object detectable by the detection unit 321 preferably includes at least one of a person or a vehicle.

The machine-learned model 331 is preferably configured to detect the object and the specific part by using the DNN. However, the machine-learned model 331 may also be configured to detect the object and the specific part by using another machine learning algorithm such the SVM using the HOG feature amount, for example. Furthermore, the detection unit 321 may be configured to detect the object and the specific part by using, for example, template matching or the like without using the machine-learned model 331 on which machine learning has been performed.

The concealment unit 322 performs the concealment processing for performing concealment on the captured image based on the detection result of the detection unit 321. The concealment processing is processing of processing the captured image (data) to protect the personal information. The concealment processing is different between a case where both the object (including the specific part) and the specific part have been detected and a case where only the object out of the object (including the specific part) and the specific part has been detected. That is, the concealment unit 322 changes a concealment method between a case where both the object and the specific part have been detected and a case where only the object out of the object and the specific part has been detected. For example, the method of performing the concealment processing is changed between a case where both the vehicle and the license plate have been detected and a case where only the vehicle has been detected without detecting the license plate.

With this configuration, in a case where a specific part that needs to be processed to protect the personal information has been able to be detected, it is possible to conceal the specific part by suppressing a concealment range from being excessively wide. In addition, even in a case where the specific part has not been able to be detected, when the object having the specific part has been able to be detected, the concealment processing can be performed by a method different from that in a case where the specific part has been able to be detected, and thus, it is possible to reduce a possibility that the concealment is not fully made in the concealment processing for protecting the personal information.

Note that the specific part is a partial element of the object, and in a case where the specific part can be detected, the object having the specific part can also be usually detected. That is, a state in which only the specific part out of the object having the specific part and the specific part is detected is less likely to occur. In a case where such a state occurs, the concealment processing similar to that in a case where both the object and the specific part have been able to be detected may be performed. As a result, the personal information can be protected. In addition, in a case where both the object and the specific part cannot be detected, there is no personal information protection target, and the concealment processing is not performed.

Specifically, the concealment processing performed by the concealment unit 322 is first concealment processing of concealing the specific part as a target in a case where both the object and the specific part have been detected. The first concealment processing is processing of concealing only the specific part of the entire object in the captured image. For example, the first concealment processing is processing of concealing only the license plate in the entire vehicle in the captured image. The first concealment processing may be, for example, processing of filling the specific part with one color. Furthermore, the first concealment processing may be, for example, processing of blurring the specific part or pixelizing the specific part.

Note that a range in which the concealment is performed by the first concealment processing may completely coincide with a detection range of the specific part, but does not have to completely coincide with the detection range of the specific part. The personal information may be protected by performing the concealment processing on the specific part.

The range in which the concealment is performed by the first concealment processing is preferably wider than the detection range of the specific part. As a result, the personal information can be appropriately protected in consideration of an error in the detection range of the specific part.

The concealment processing performed by the concealment unit 322 is second concealment processing of concealing the object as a target in a case where only the object out of the object and the specific part has been detected. The second concealment processing is processing of concealing the entire object in the captured image. For example, the second concealment processing is processing of concealing the entire vehicle in the captured image in a case where the vehicle has been able to be detected from the captured image but the license plate has not been able to be detected. The second concealment processing may be, for example, processing of filling the entire object in the captured image with one color. Furthermore, the second concealment processing may be, for example, processing of blurring the entire object or pixelizing the entire object in the captured image.

Note that a range in which the concealment is performed by the second concealment processing may completely coincide with a detection range of the object, but does not have to completely coincide with the detection range of the object. The personal information may be protected by performing the concealment processing on the object. The range in which the concealment is performed by the second concealment processing is preferably wider than the detection range of the object. As a result, the personal information can be appropriately protected in consideration of an error in the detection range of the object.

In the present embodiment, in a case where the specific part that needs to be processed to protect the personal information has been able to be detected, the image processing device 3 conceals only the specific part. Therefore, it is possible to prevent the captured image from being excessively processed and to prevent information regarding the object from being excessively reduced. In addition, according to the present embodiment, even in a case where the specific part has not been able to be detected, when the object having the specific part has been able to be detected, the concealment is performed on the entire object, and thus, it is possible to reduce a possibility that the concealment of the specific part is not fully made.

4-2. Example of Operation of Image Processing Device

Figure 13:
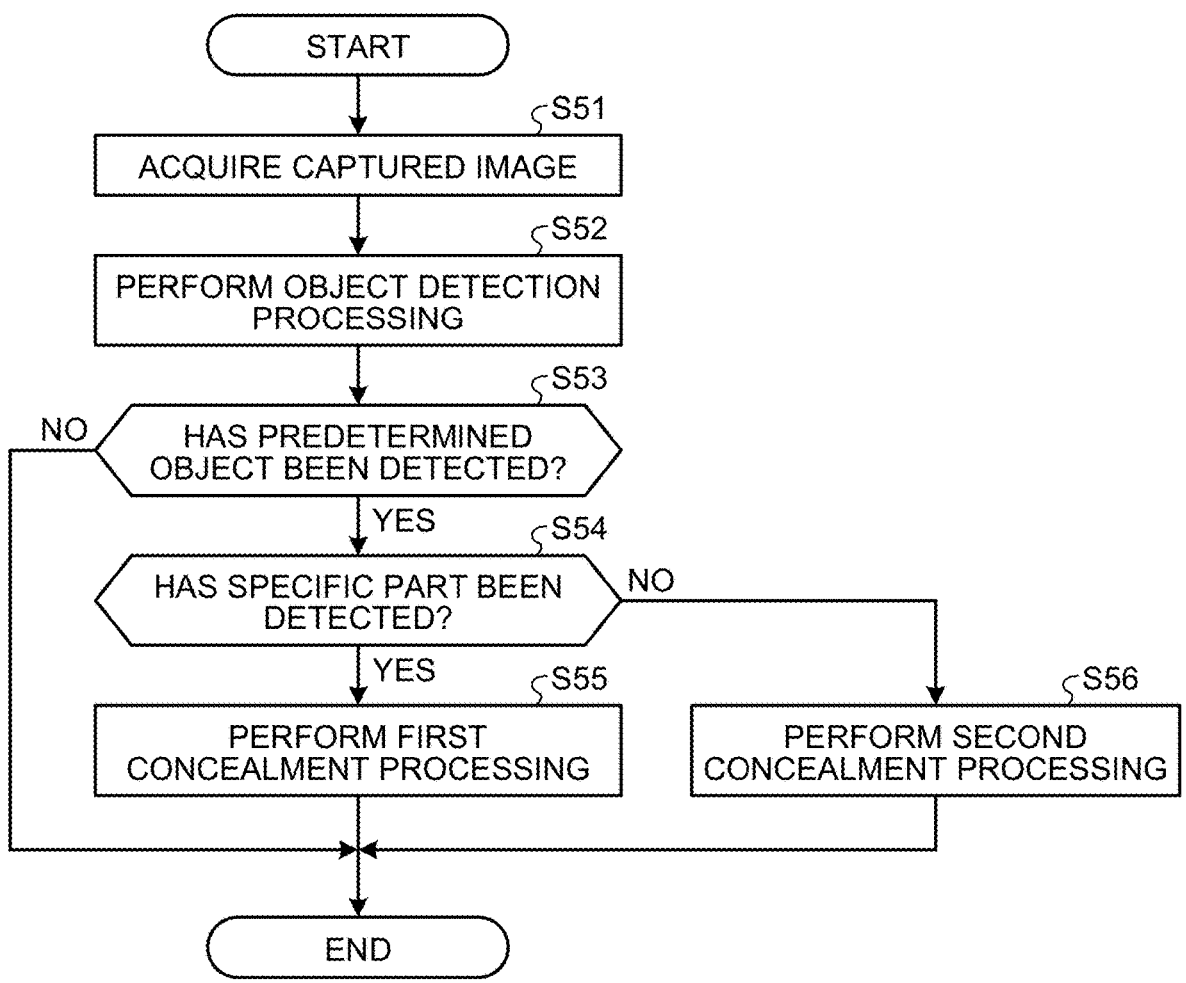
FIG. 13 is a flowchart illustrating an example of an operation of the image processing device according to the fourth embodiment.
Figure 14:
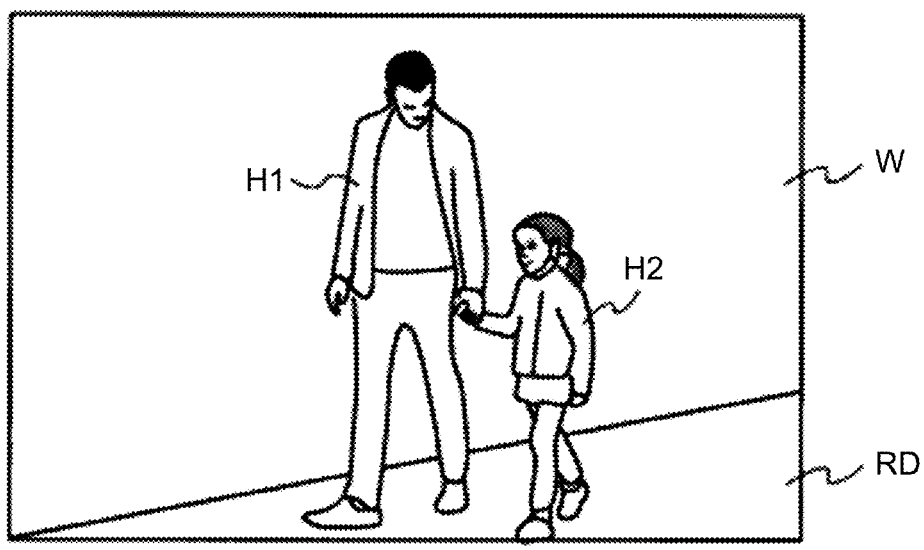
FIG. 14 is a diagram illustrating an example of a captured image acquired by an acquisition unit.

FIG. 13 is a flowchart illustrating an example of an operation of the image processing device 3 according to the fourth embodiment of the present invention. FIG. 14 is a diagram illustrating an example of the captured image acquired by the acquisition unit 31. Note that the image processing device 3 performs the operation of the flowchart illustrated in FIG. 13, for example, every time the captured image is acquired by the acquisition unit 31.

In Step S51, the acquisition unit 31 acquires the captured image from the camera 4. The acquisition unit 31 acquires the captured image as illustrated in FIG. 14, for example. The captured image illustrated in FIG. 14 shows two persons H1 and H2 walking along a wall W disposed beside a road RD. Once the acquisition unit 31 acquires the captured image, the processing proceeds to the next Step S52.

In Step S52, the detection unit 321 performs the object detection processing. Specifically, the detection unit 321 attempts to detect the predetermined object and the specific part of the predetermined object by using the machine-learned model 331. For example, in a case where the predetermined object is a person, the detection unit 321 attempts to detect the person and the face included in the captured image. Once the object detection processing is completed, the processing proceeds to Step S53.

Figure 15:
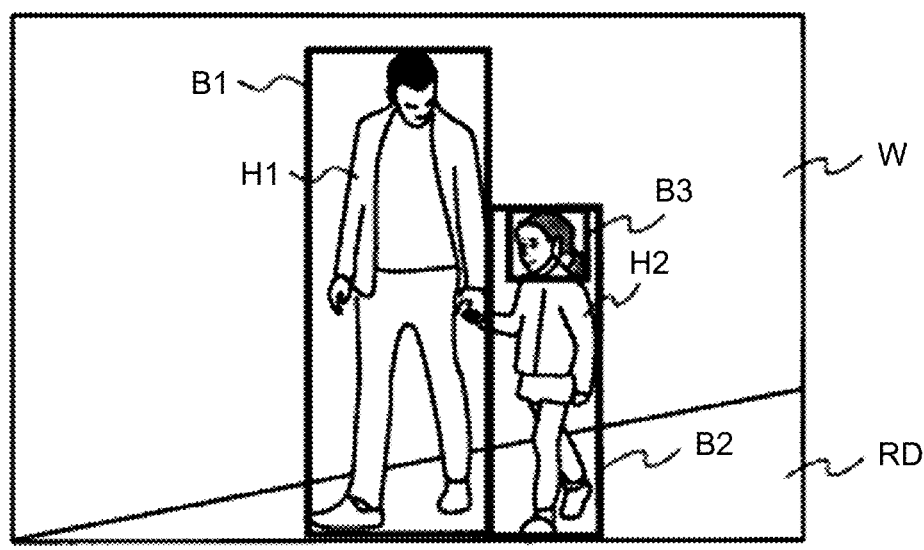
FIG. 15 is a diagram illustrating a detection result of a detection unit for the captured image illustrated in FIG. 14.

FIG. 15 is a diagram illustrating a detection result of the detection unit 321 for the captured image illustrated in FIG. 14. In FIG. 15, thick frames B1 to B3 are bounding boxes. The detection unit 321 completes classification of the object in the respective bounding boxes B1 to B3. In the example illustrated in FIG. 15, the detection unit 321 can detect the person H1 (bounding box B1) in the captured image, but cannot detect a face of the person H1. In this example, it is considered that a feature of the face is not recognized and the face of the person H1 cannot be detected, because, for example, the person H1 faces downward. The detection unit 321 can detect the person H2 (bounding box B2) in the captured image and a face (bounding box B3).

In Step S53, the concealment unit 322 determines whether or not the detection unit 321 has detected the predetermined object. For example, in a case where the predetermined object is a person, it is determined whether or not the person is detected from the captured image. In a case where it is determined that the predetermined object has been detected (Yes in Step S53), the processing proceeds to Step S54. On the other hand, in a case where it is determined that the predetermined object has not been detected (No in Step S53), the processing illustrated in the flowchart of FIG. 13 temporarily ends. Note that, in the example illustrated in FIG. 13, it is assumed that a situation in which only the specific part is detected without detecting the predetermined object does not occur.

In the example illustrated in FIG. 15, both the person H1 and the person H2 are detected. For this reason, in the example illustrated in FIG. 15, the processing proceeds to Step S54.

In Step S54, the concealment unit 322 determines whether or not the detection unit 321 has detected the specific part of the predetermined object. For example, in a case where the object detected by the detection unit 321 is a person, it is determined whether or not the face that is the specific part has been detected from the captured image. In a case where it is determined that the specific part has been detected (Yes in Step S54), the processing proceeds to Step S55. On the other hand, in a case where it is determined that the specific part has not been detected (No in Step S54), the processing proceeds to Step S56.

Note that, in Step S54, in a case where a plurality of predetermined objects is detected in Step S52, it is determined whether or not the specific part is detected for each predetermined object. That is, it is determined which one of Step S55 and Step S56 the processing needs to proceed to for each detected object.

In the example illustrated in FIG. 15, since the person H1 and the person H2 are detected, it is determined whether or not the face that is the specific part has been detected for each of the persons H1 and H2. Since the face of the person H1 has not been detected, it is determined that the processing needs to proceed to Step S56. Since the face of the person H2 has been detected, it is determined that the processing needs to proceed to Step S55.

In Step S55, the concealment unit 322 performs the first concealment processing on the specific part. For example, in a case where the object detected by the detection unit 321 is a person, the first concealment processing is performed on the detected face. Once the first concealment processing is completed, the processing illustrated in the flowchart in FIG. 13 temporarily ends.

In Step S56, the concealment unit 322 performs the second concealment processing on the predetermined object. For example, in a case where the object detected by the detection unit 321 is a person, the second concealment processing is performed on the entire detected person. Once the second concealment processing is completed, the processing illustrated in the flowchart in FIG. 13 temporarily ends.

Figure 16:
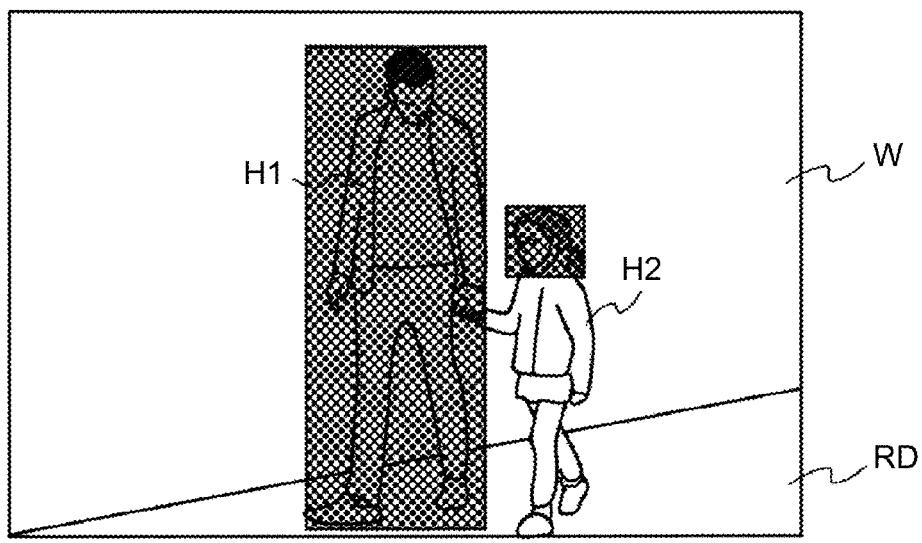
FIG. 16 is a diagram illustrating a result of concealment processing performed according to the detection result illustrated in FIG. 15.

FIG. 16 is a diagram illustrating a result of the concealment processing performed according to the detection result illustrated in FIG. 15. Since the face of the person H1, that is the specific part, has not been detected, the processing proceeds to Step S56, and the concealment is performed for the entire detected person. In the example illustrated in FIG. 16, pixelization for concealment is performed on the entire region surrounded by the bounding box B1 indicating the detection of the person H1. On the other hand, since the face of the person H2, that is the specific part, has been detected, the processing proceeds to Step S55, and the concealment is performed on the detected face. In the example illustrated in FIG. 16, pixelization for concealment is applied to the entire region surrounded by the bounding box B3 indicating the detection of the face of the person H2.

Note that, instead of pixelization processing for concealment, for example, blurring processing or filling processing may be performed. Furthermore, the processing for concealment may be performed, for example, in a range slightly wider than the region surrounded by the bounding boxes B1 and B3.

4-3. Modified Example

Figure 17:
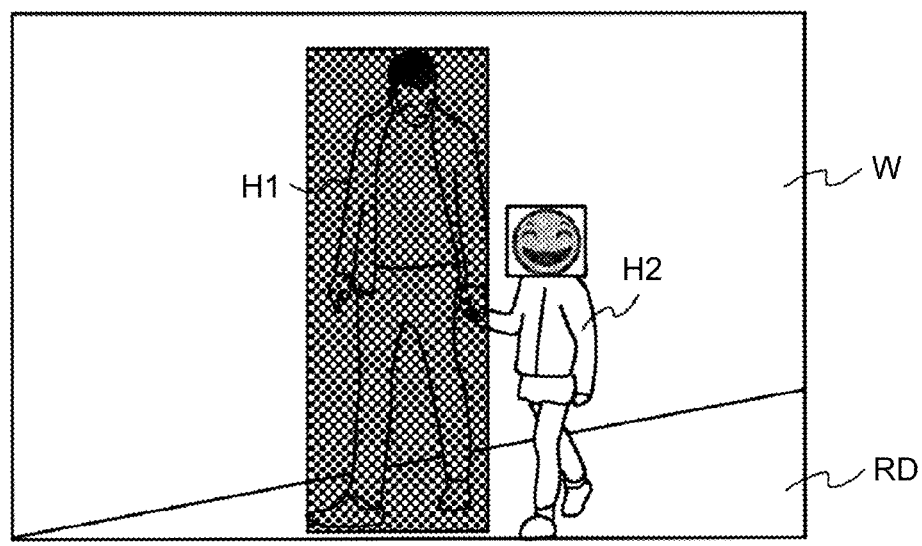
FIG. 17 is a diagram for describing a modified example of the concealment processing performed by a concealment unit.

FIG. 17 is a diagram for describing a modified example of the concealment processing performed by the concealment unit 322. FIG. 17 is a diagram illustrating the captured image on which the concealment processing has been performed. Note that, in the example illustrated in FIG. 17, similarly to FIG. 16 described above, the concealment processing (second concealment processing) targeting the entire detected person is performed on the person H1, and the concealment processing (first concealment processing) targeting the specific part (face) is performed on the person H2.

In performing the concealment processing, the concealment unit 322 may replace at least one of the object (including the specific part) or the specific part obtained from the captured image with a computer graphics (CG) image. In the example illustrated in FIG. 17, only the specific part (the face of the person H2) obtained from the captured image is replaced with the CG image. The object (person H1) obtained from the captured image is not replaced with the CG image, and the pixelization for concealment is performed thereon. However, the object (person H1) obtained from the captured image may also be replaced with the CG image. In addition, the object (person H1) obtained from the captured image may be replaced with the CG image, and pixelization or the like may be performed on the specific part (the face of the person H2) instead of replacement with the CG image.

Furthermore, the concealment unit 322 may perform the concealment processing on at least one of the object (including the specific part) or the specific part obtained from the captured image while reflecting the feature obtained from the captured image. As a result, it is possible to prevent the amount of information obtained from the captured image from being reduced while protecting the personal information.

In the example illustrated in FIG. 17, the concealment processing is performed only on the specific part (the face of the person H2) obtained from the captured image while reflecting the feature obtained from the captured image. The object (person H1) obtained from the captured image is simply pixelized for concealment. However, the concealment processing may be performed on the object (person H1) obtained from the captured image while reflecting the feature obtained from the captured image. The concealment processing may be performed on the object (person H1) obtained from the captured image while reflecting the feature obtained from the captured image, and the pixelization or the like may be simply performed on the specific part (the face of the person H2).

For example, in a case where the specific part is the face, the feature obtained from the captured image is an orientation of the face, a line of sight, an expression, an age group, gender, or the like. The feature obtained from the captured image is, for example, age, gender, or the like in a case where the object having the specific part is a person. For example, in a case where the object having the specific part is a vehicle, the feature obtained from the captured image includes a vehicle type (automobile, motorcycle, or the like), a vehicle application type (a passenger car, a truck, a bus, a taxi, or the like), or a vehicle body type (a sedan, a minivan, a station wagon, or the like).

In the example illustrated in FIG. 17, the CG image reflecting the expression (smile) obtained from the captured image is used. In addition to the display, for example, in a case where it is detected that the person H1 is a girl, the face of the girl in the captured image may be replaced with the CG image of a smiling girl. For the detection of the feature obtained from the captured image, for example, a machine learning algorithm such as the DNN, template matching, or the like may be used. Furthermore, the feature obtained from the captured image may be detected in consideration of information obtained from a sensor other than the camera, such as a biological sensor.

Furthermore, the concealment unit 322 may conceal at least one of the object (including the specific part) or the specific part in the captured image by encrypting the object and/or the specific part in a decodable manner. As a result, for example, in a special case where it is necessary to confirm the personal information in the captured image in order to solve a case, it is possible to confirm the personal information by decrypting the encrypted captured image.

For example, the encryption is performed in the vehicular device 100, and the decryption is performed in the data collection device 200 in a case where a predetermined condition is satisfied. The predetermined condition is, for example, a case where permission is obtained from the occupant of the vehicular device 100. As the encryption scheme, for example, known common key encryption, public key encryption, a combination of the common key encryption and the public key encryption, or the like may be used. In a case of using the combination, for example, the public key encryption using a public key and a private key is used when a common key is transferred, and the common key is used for encryption of image data. Note that the vehicular device 100 may store data before encryption or may store encrypted data.

5. Fifth Embodiment

Next, an image processing device according to the fifth embodiment will be described. In a description of the image processing device of the fifth embodiment, a description of portions overlapping with the fourth embodiment will be omitted unless it is particularly necessary to describe the portions.

5-1. Configuration of Image Processing Device

Figure 18:
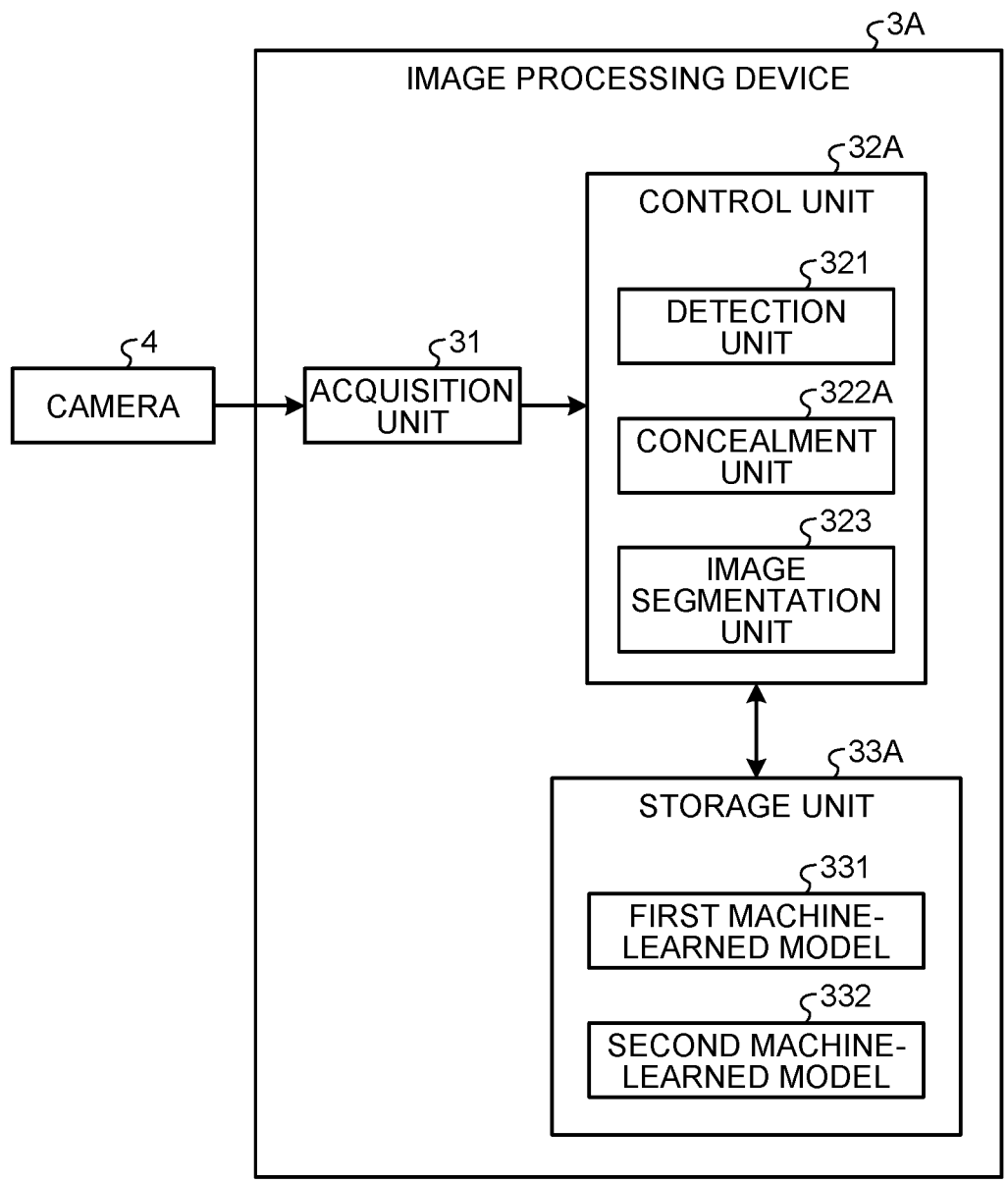
FIG. 18 is a diagram illustrating a configuration of an image processing device according to the fifth embodiment.

FIG. 18 is a diagram illustrating a configuration of an image processing device 3A according to the fifth embodiment of the present invention. Note that, in FIG. 18, only components necessary for describing features of the image processing device 3A of the fifth embodiment are illustrated, and a description of general components is omitted. FIG. 18 also illustrates the camera 4 which is a component separate from the image processing device 3A for easy understanding. As illustrated in FIG. 18, the image processing device 3A includes an acquisition unit 31, a control unit 32A, and a storage unit 33A.

Since the acquisition unit 31 is similar to that of the fourth embodiment, a description thereof will be omitted.

Similarly to the fourth embodiment, the control unit 32A is a controller that integrally controls the entire image processing device 3A. The control unit 32A is implemented by a computer including, for example, a CPU, a RAM, a ROM, and the like. However, the control unit 32A has a function different from that of the fourth embodiment. This difference will be described later.

The storage unit 33A has the same configuration as that of the fourth embodiment, but is different from that of the fourth embodiment in that a first machine-learned model 331 and a second machine-learned model 332 are stored. The first machine-learned model 331 is similar to the machine-learned model 331 of the fourth embodiment, and is used for object detection. The second machine-learned model 332 is used for image segmentation as described later. The second machine-learned model 332 is obtained by performing learning by using a machine learning algorithm such as the DNN.

A detection unit 321, a concealment unit 322A, and an image segmentation unit 323 illustrated in FIG. 18 are functions of the control unit 32A implemented by the CPU of the control unit 32A performing arithmetic processing according to a program stored in the storage unit 33A. In other words, the image processing device 3A includes the detection unit 321, the concealment unit 322A, and the image segmentation unit 323.

Note that at least one of the unit 321, 322A, or 323 of the control unit 32A may be implemented by hardware such as an ASIC, an FPGA, or a GPU. The respective units 321, 322A, and 323 are conceptual components. The functions executed by one component may be distributed to a plurality of components, or the functions of a plurality of components may be integrated into one component.

Since a configuration of the detection unit 321 is similar to that of the fourth embodiment, a description thereof will be omitted. Note that the detection unit 321 detects the predetermined object having a specific part that needs to be concealed and the specific part of the predetermined object from the captured image by using the first machine-learned model 331.

The image segmentation unit 323 performs image segmentation in which each pixel of the captured image acquired by the acquisition unit 31 is labeled with a meaning. The image segmentation unit 323 performs the image segmentation on the captured image by using the second machine-learned model 332 stored in the storage unit 33A. A plurality of elements included in the captured image is segmented by the image segmentation.

In the present embodiment, as an example, segmentation in which the object having the specific part is distinguished from an element such as another object is performed by the image segmentation, and segmentation in which the elements constituting the object having the specific part are segmented is not performed. By performing the image segmentation, it is possible to extract a region occupied by the object having the specific part in the image.

Note that, in the present embodiment, the object detection by the detection unit 321 and the image segmentation by the image segmentation unit 323 are performed in parallel. In addition, the image segmentation unit 323 preferably performs the image segmentation by the second machine-learned model 332 using a low-resolution image obtained by reducing the resolution of the captured image acquired from the acquisition unit 31. As a result, the processing load of the image segmentation in the image segmentation unit 323 can be reduced. The low-resolution image used for the object detection by the detection unit 321 and the low-resolution image used for the image segmentation may have the same resolution, or may have different resolutions. For example, the low-resolution image used for the image segmentation may have a lower resolution than that of the low-resolution image used for the object detection.

As in the fourth embodiment, the concealment unit 322A performs switching between the first concealment processing targeting the specific part and the second concealment processing targeting the object having the specific part based on the detection result of the detection unit 321. The first concealment processing performed by the concealment unit 322A is similar to that of the fourth embodiment. However, the second concealment processing performed by the concealment unit 322A is different from that of the fourth embodiment.

In the fifth embodiment, the second concealment processing is processing performed on a region corresponding to the object (including the specific part) obtained by the image segmentation to obtain an image in which the feature of the object is reduced. Examples of the image in which the feature of the object is reduced include a filled image, a blurred image, and a pixelized image. With such a configuration, when concealing the object having the specific part as a target, the concealment can be performed while leaving the shape of the object as much as possible. That is, it is possible to appropriately perform the concealment for protecting the personal information while reducing the amount of information to be reduced from the captured image by the concealment processing. In the present embodiment, the second concealment processing can be interpreted as performing the concealment processing while reflecting the feature of the object (including the specific part) obtained from the captured image.

Note that a range in which the concealment is performed by the second concealment processing may completely coincide with the region corresponding to the object (including the specific part) obtained by the image segmentation, but does not have to completely coincide with the region corresponding to the object (including the specific part) obtained by the image segmentation. The range in which the concealment is performed by the second concealment processing may be, for example, slightly wider than the region corresponding to the object obtained by the image segmentation.

5-2. Example of Operation of Image Processing Device

Figure 19:
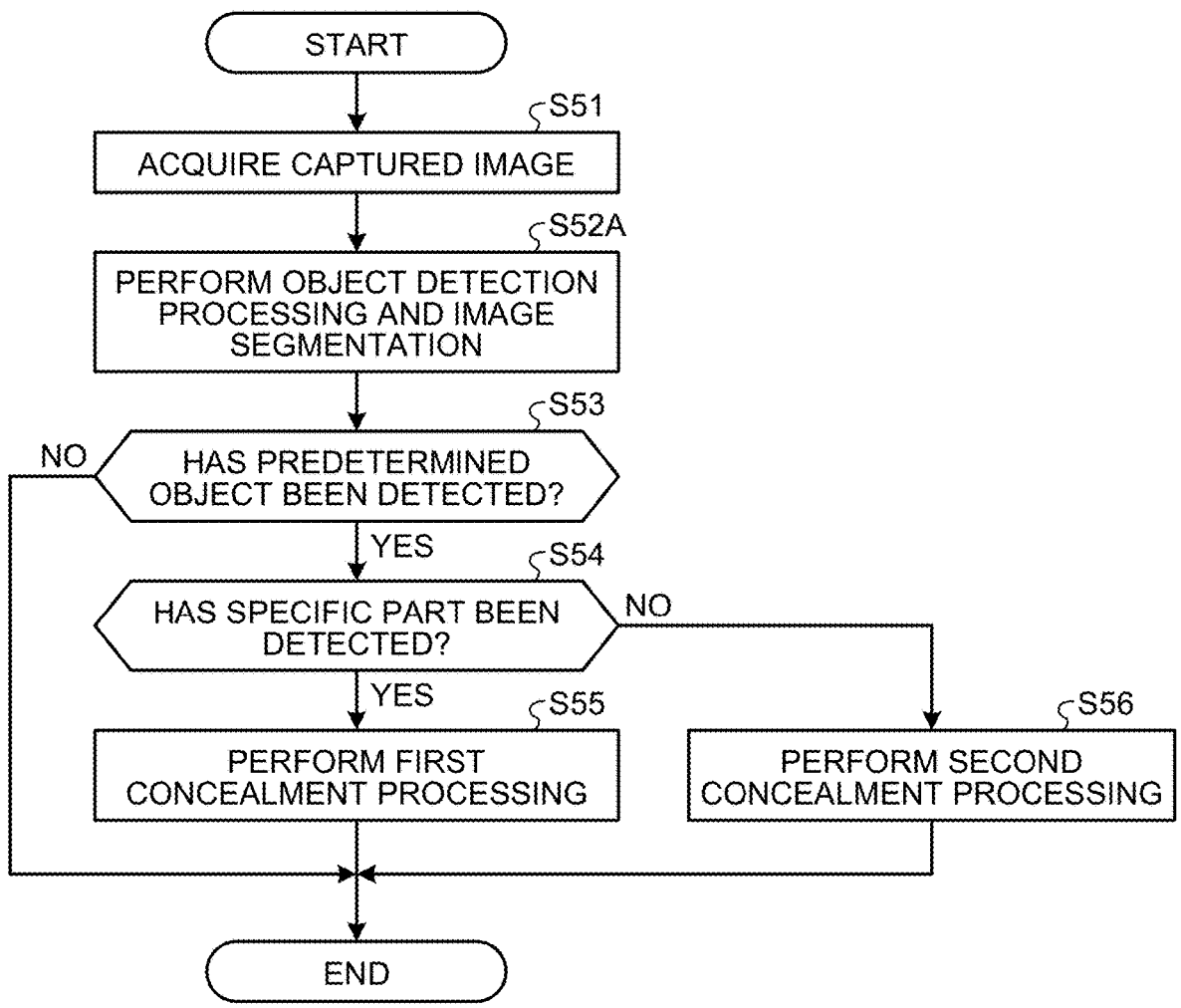
FIG. 19 is a flowchart illustrating an example of an operation of the image processing device according to the fifth embodiment.

FIG. 19 is a flowchart illustrating an example of an operation of the image processing device 3A according to the fifth embodiment of the present invention. Since the operation of the image processing device 3A of the fifth embodiment is substantially the same as the operation of the image processing device 3 of the fourth embodiment, differences will be mainly described.

First, the acquisition unit 31 acquires the captured image from the camera 4 (Step S51). The object detection processing (detection of the predetermined object and the specific part) performed by the detection unit 321 and the image segmentation performed by the image segmentation unit 323 are performed in parallel by using the acquired captured image (Step S52A).

Figure 20:
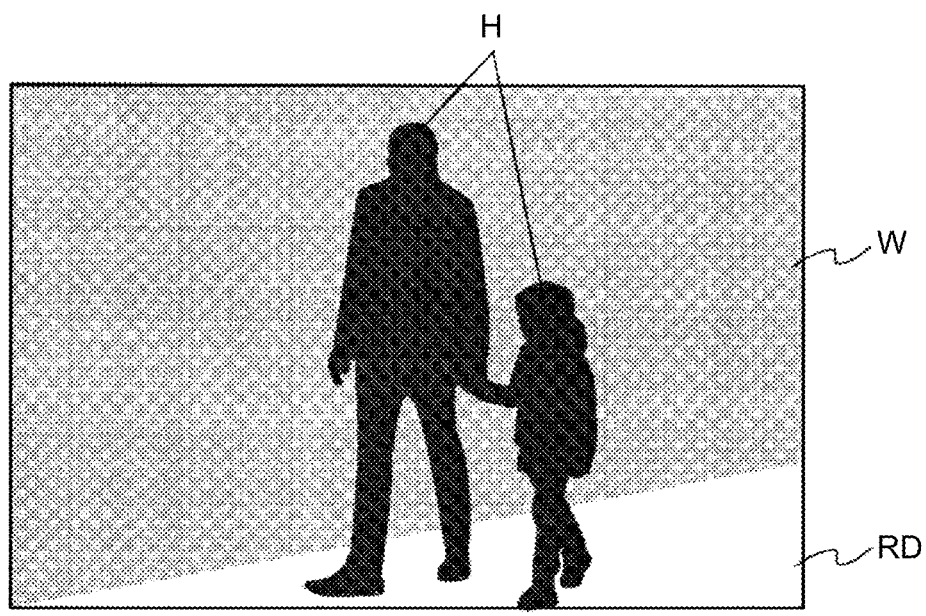
FIG. 20 is a diagram illustrating a result of image segmentation for the captured image illustrated in FIG. 14.

FIG. 20 is a diagram illustrating a result of the image segmentation for the captured image illustrated in FIG. 14. The road RD, the wall W, and the person H are classified by the image segmentation. In the example illustrated in FIG. 20, each of the classified elements RD, W, and H is distinguished by changing a filling color.

Note that the classification of each element may be performed by, for example, changing the type of hatching instead of changing the filling color.

Once the object detection by the detection unit 321 and the image segmentation by the image segmentation unit 323 are completed, it is determined whether or not the predetermined object has been detected by the detection unit 321 (Step S53). In a case where the predetermined object has not been detected (No in Step S53), the processing illustrated in the flowchart in FIG. 13 temporarily ends. In a case where the predetermined object has been detected (Yes in Step S53), it is determined whether or not the specific part of the predetermined object has been detected by the detection unit 321 (Step S54). Note that, in Step S54, in a case where a plurality of predetermined objects is detected in Step S52, it is determined whether or not the specific part is detected for each predetermined object.

In a case where the specific part has been detected (Yes in Step S54), the first concealment processing is performed on the specific part (Step S55). In a case where the specific part has not been detected (No in Step S54), the second concealment processing is performed on the object having the specific part (Step S56). The second concealment processing is performed based on the result of the image segmentation.

Figure 21:
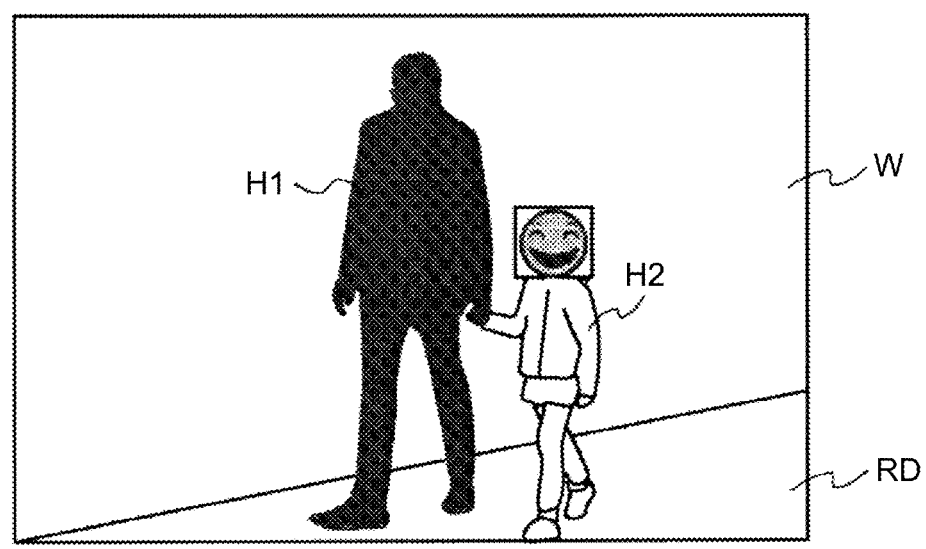
FIG. 21 is a diagram illustrating a concealment processing result in a case where the captured image illustrated in FIG. 14 is input in the image processing device according to the fifth embodiment.

FIG. 21 is a diagram illustrating a concealment processing result in a case where the captured image illustrated in FIG. 14 is input in the image processing device 3A according to the fifth embodiment. In this example, the detection result of the detection unit 321 is the same as the result illustrated in FIG. 15 of the fourth embodiment. That is, the person H1 has been detected as a person, but the face that is the specific part has not been able to be detected. The person H2 has been detected as a person, and the face of the person H2 has also been detected.

In FIG. 21, the second concealment processing is performed on the person H1. That is, in the captured image acquired by the acquisition unit 31, a region corresponding to the person H1 obtained by the image segmentation is an image (a filled image in this example) in which the feature of the person is reduced. As a result, the personal information of the person H1 is concealed while leaving information such as the size and posture of the person H1.

In this example, specifically, an image generated at the time of the image segmentation (see FIG. 20) is applied as the image in which the feature of the person is reduced. That is, the image generated at the time of the image segmentation is applied as an image in which the feature of the object (including the specific part) is reduced. With this configuration, for example, an image in which the personal information is concealed can be obtained using an image combination method such as alpha blending.

In FIG. 21, the first concealment processing is performed on the person H2. In the example illustrated in FIG. 21, the region corresponding to the specific part (face) detected by the detection unit 321 is replaced with the CG image. However, for concealing the specific part, for example, filling, blurring, pixelization, or the like may be used.

Although not illustrated in FIG. 11 described above, data transmitted from the vehicular device 100 to the data collection device 200 includes tag data and actual data.

Figure 22:
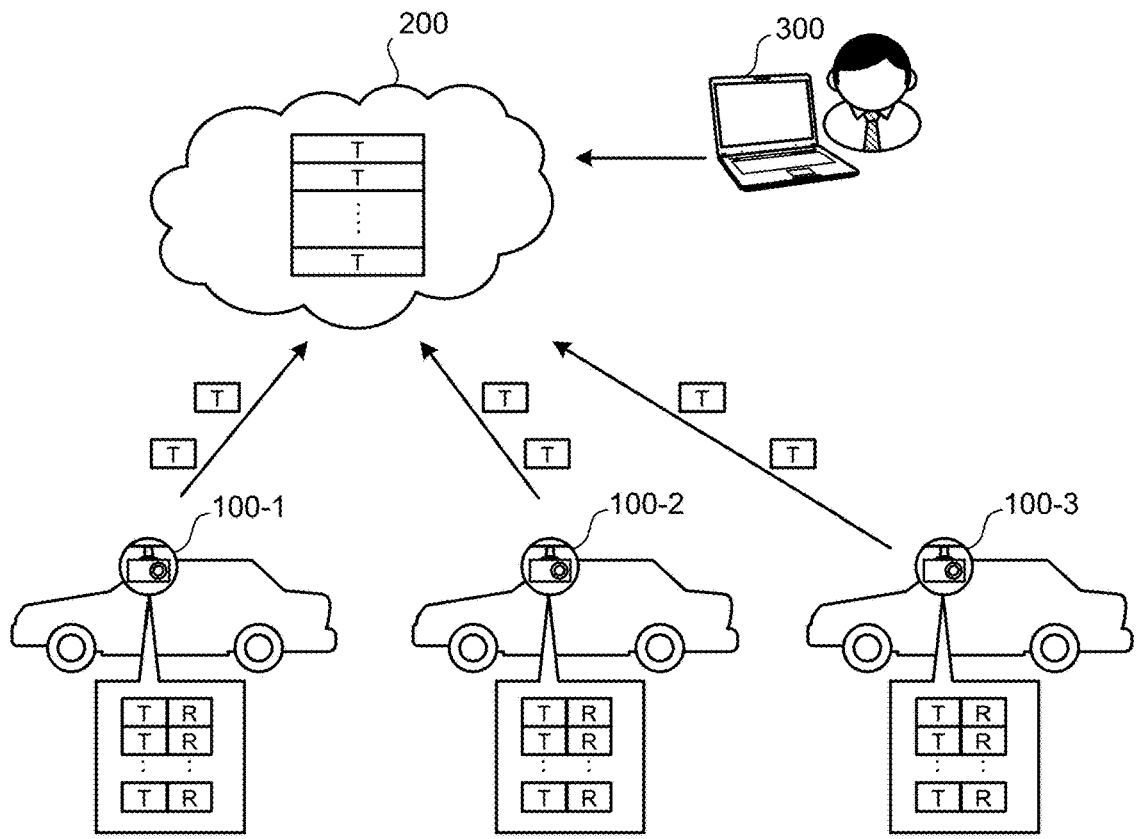
FIG. 22 is a diagram (Part 1) illustrating an example of an operation of the personal information protection system.
Figure 23:
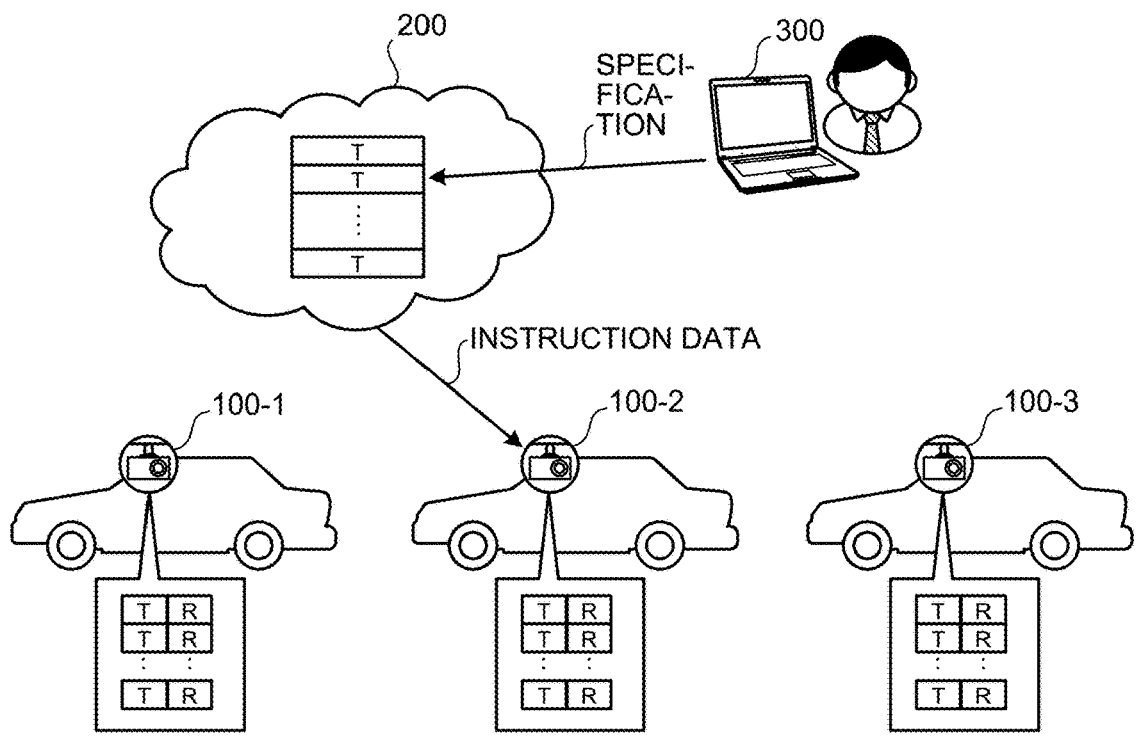
FIG. 23 is a diagram (Part 2) illustrating an example of the operation of the personal information protection system.
Figure 24:
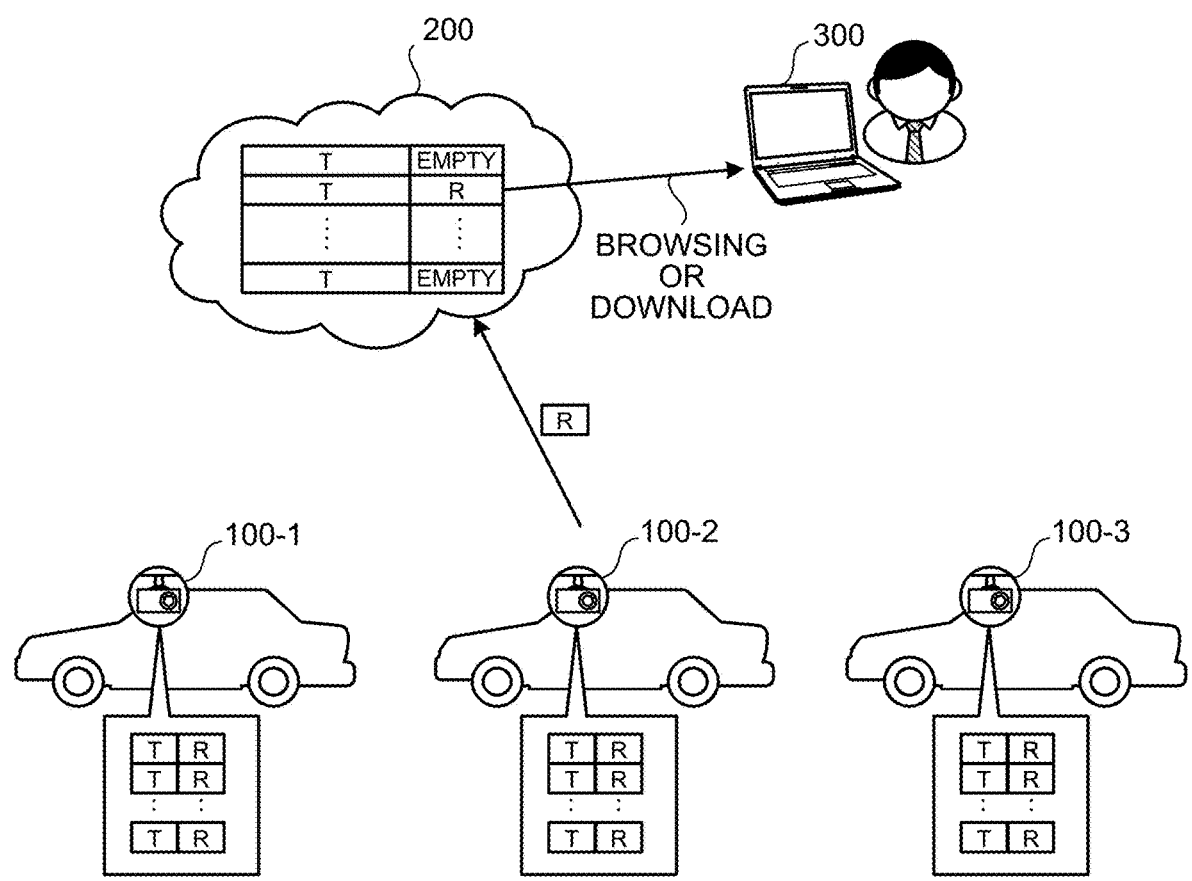
FIG. 24 is a diagram (Part 3) illustrating an example of the operation of the personal information protection system.

As supplementary items including this point, a series of flow until data is provided to the data user in the personal information protection system S will be specifically described with reference to FIGS. 22 to 24. FIG. 22 is a diagram (Part 1) illustrating an example of an operation of the personal information protection system S. FIG. 23 is a diagram (Part 2) illustrating an example of the operation of the personal information protection system S. FIG. 24 is a diagram (Part 3) illustrating an example of the operation of the personal information protection system S.

As illustrated in FIG. 22, first, the data user specifies a collection condition by a user terminal 300 connected to the data collection device 200.

Furthermore, at this time, the data collection device 200 generates generation data for generating tag data T having a characteristic as index data added to the actual data R to be collected and used to, for example, search for, grasp an outline of, or select the actual data R. Note that the generation data of the tag data T is generated based on an operation of the data user while using a program or generation data stored in the user terminal 300 or the data collection device 200.

Then, the specified collection condition and the generated generation data of the tag data T are stored in the data collection device 200, distributed to the vehicle that is a data collection target, and stored also in the vehicular device 100.

Next, each vehicular device 100 monitors output data of various sensors, and stores the actual data R in a storage device when an event satisfying the stored collection condition occurs. Further, each vehicular device 100 generates and stores the tag data T corresponding to the actual data R based on the generation data of the tag data T and the actual data R stored.

Note that it is preferable that the tag data T is not data obtained by simply extracting a part of the actual data R, but is metainformation that can be used to grasp the outline of the actual data R when the data user refers to the tag data T to determine necessity of the actual data R.

Then, each vehicular device 100 uploads the tag data T to the data collection device 200 at any time, and the data collection device 200 stores the tag data T at any time. At this time, the actual data R is not uploaded to the data collection device 200. Furthermore, the term "at any time" as used herein widely includes not only the meaning of "in real time (that is, "immediately")" but also a certain degree of real-time property such as a case of uploading all at once when a communication environment is established. The term "at any time" is not limited to the case where the communication environment is established, but may include a case where a predetermined amount of data is accumulated, a case where a predetermined time has elapsed from the previous upload, a case where the vehicle has traveled a predetermined distance, and the like. The term "at any time" may also include the meaning of "periodically".

Then, when the data user establishes connection to the data collection device 200 by the user terminal 300 in order to check a data collection status and collect the actual data R, the metainformation based on the tag data T collected by the data collection device 200 is displayed on the user terminal 300. At the same time, a user interface (UI) screen for performing an operation of selecting the actual data R corresponding to each tag data T is displayed.

Then, as illustrated in FIG. 23, when the data user specifies, by the user terminal 300, the tag data T corresponding to the actual data R to be collected, "instruction data" for specifying the actual data R is transmitted to the corresponding vehicular device 100 via the data collection device 200.

Thereafter, as illustrated in FIG. 24, the specified actual data R is selected, uploaded from each vehicular device 100 to the data collection device 200, and stored in the data collection device 200. Then, the data user accesses the actual data R stored in the data collection device 200 by the user terminal 300, and browses and downloads the actual data R. The encrypted personal information is decrypted at this time.

Note that, from the viewpoint of a storage capacity of the vehicular device 100, the actual data R uploaded to the data collection device 200 and the tag data T corresponding thereto are preferably deleted from the vehicular device 100 after the upload to the data collection device 200 is completed.

6. Sixth Embodiment

Figure 26:
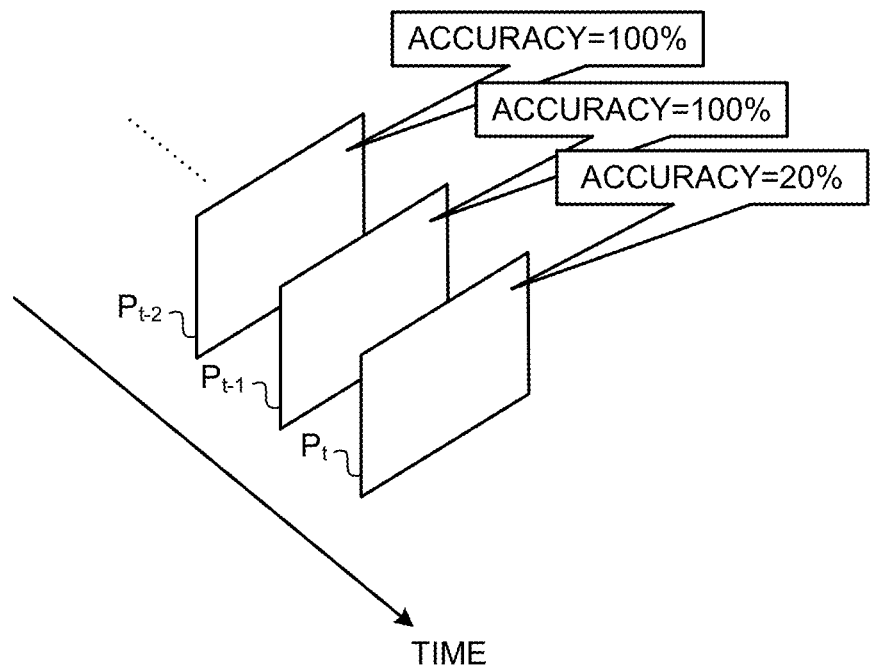
FIG. 26 is a schematic explanatory diagram (Part 2) of the image processing method according to the sixth embodiment.
Figure 27:
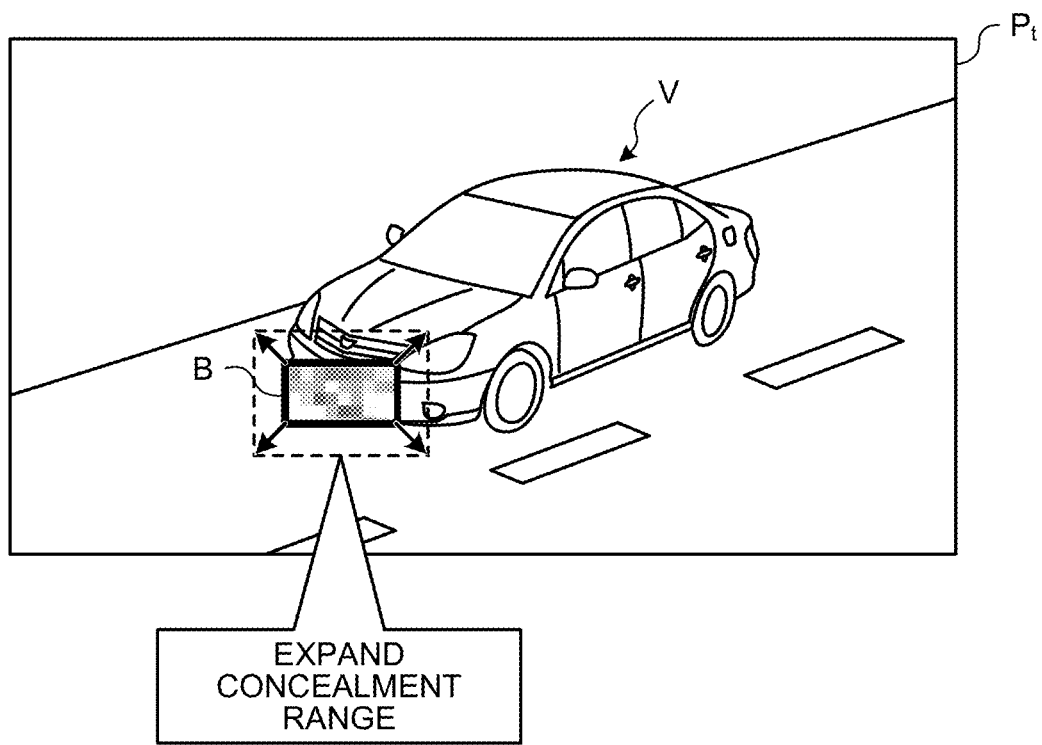
FIG. 27 is a schematic explanatory diagram (Part 3) of the image processing method according to the sixth embodiment.

Next, an image processing method according to the sixth embodiment will be described with reference to FIGS. 25 to 27. FIG. 25 is a schematic explanatory diagram (Part 1) of the image processing method according to the sixth embodiment. Further, FIG. 26 is a schematic explanatory diagram (Part 2) of the image processing method according to the sixth embodiment. Further, FIG. 27 is a schematic explanatory diagram (Part 3) of the image processing method according to the sixth embodiment.

In the image processing method according to the sixth embodiment, an attempt is made to detect an object having a specific part that needs to be concealed to protect the personal information or the specific part from an acquired captured image, and concealment processing of concealing the object or the specific part of the captured image is performed based on the detection result. Further, the concealment processing is performed in such a manner that the lower the detection accuracy for the detected object or the specific part is, the wider the concealment range in which the concealment is performed is.

Specifically, as illustrated in FIG. 25, in the image processing method according to the sixth embodiment, the image processing device 5 included in the personal information protection system S attempts to detect an object having a specific part that needs to be concealed to protect the personal information or the specific part from the acquired captured image P.

Such detection is performed using, for example, a machine-learned model 531 (see FIG. 28) obtained by machine learning. In a case where the predetermined object and the specific part of the object are included in the input captured image P, the machine-learned model 531 outputs, as the detection range, a range corresponding to the object or the specific part. The machine-learned model 531 also outputs a detection accuracy (hereinafter, may be simply referred to as "accuracy") indicating the degree of certainty of detection.

Then, the image processing device 5 performs the "concealment processing" on the object or the specific part of the captured image P based on the detection result. As described above, the "concealment processing" is, for example, processing of reducing the resolution of the captured image P, processing of encrypting the entire or a part of the captured image P, processing of encrypting characters and numerical data, processing of masking all unnecessary information (including the personal information) in the captured image P, and the like.

For example, FIG. 25 illustrates an example in which the license plate N of the vehicle V is detected in the captured image P with the bounding box B as the detection range, and the concealment processing of encrypting the inside of the bounding box B by pixelization processing is performed.

Meanwhile, as illustrated in FIG. 26, such concealment processing is sequentially performed on the captured images P continuously acquired in time series. Here, as illustrated in FIG. 26, it is assumed that, in the past captured images $P_{t-1}$, $P_{t-2}$, and the like, the accuracy of the detection range corresponding to the above-described bounding box B is 100%, whereas in the latest captured image $P_t$, the accuracy is decreased to 20%.

Such an event may occur due to, for example, an influence of noise mixed in the image. Then, in a case where the accuracy is decreased as described above, the detection range of the predetermined object or the specific part is shifted. In addition, the lower the accuracy is, the larger the magnitude of the shift is.

Therefore, in the image processing method according to the sixth embodiment, in a case where the accuracy of the detected object or specific part has been decreased in the latest captured image $P_t$ in time series, in other words, in the current captured image $P_t$, the image processing device 5 performs the concealment processing in such a manner that the lower the accuracy is, the wider the concealment range in which the concealment is performed is.

Specifically, as illustrated in FIGS. 26 and 27, in the image processing method according to the sixth embodiment, in a case where the accuracy in the latest captured image $P_t$ is lower than that in the past captured images $P_{t-1}$, $P_{t-2}$, and the like, the image processing device 5 expands the concealment range in such a manner as to be wider than the bounding box B, which is the detection range, according to the accuracy in the latest captured image $P_t$, and performs the concealment processing on the latest captured image $P_t$. FIG. 27 illustrates an example in which the concealment range is expanded in the four directions of the bounding box B.

Note that, in a case where there is directivity in a relationship between the accuracy and the corresponding concealment range, it is preferable to impart directivity to an expansion ratio in processing of expanding the concealment range (for example, expansion ratios in vertical and horizontal directions are multiplied by different coefficients, respectively).

As a result, it is possible to fully conceal the personal information while preventing excessive concealment. That is, with the image processing method according to the sixth embodiment, the concealment for protecting the personal information performed on the captured image P can be appropriately performed.

Hereinafter, an example of a configuration of the image processing device 5 according to the sixth embodiment will be described more specifically. Hereinafter, the latest captured image $P_t$ may be appropriately referred to as the "current captured image $P_t$". Accordingly, the accuracy in the latest captured image $P_t$ may be appropriately described as the "current accuracy".

6-1. Configuration of Image Processing Device

Figure 28:
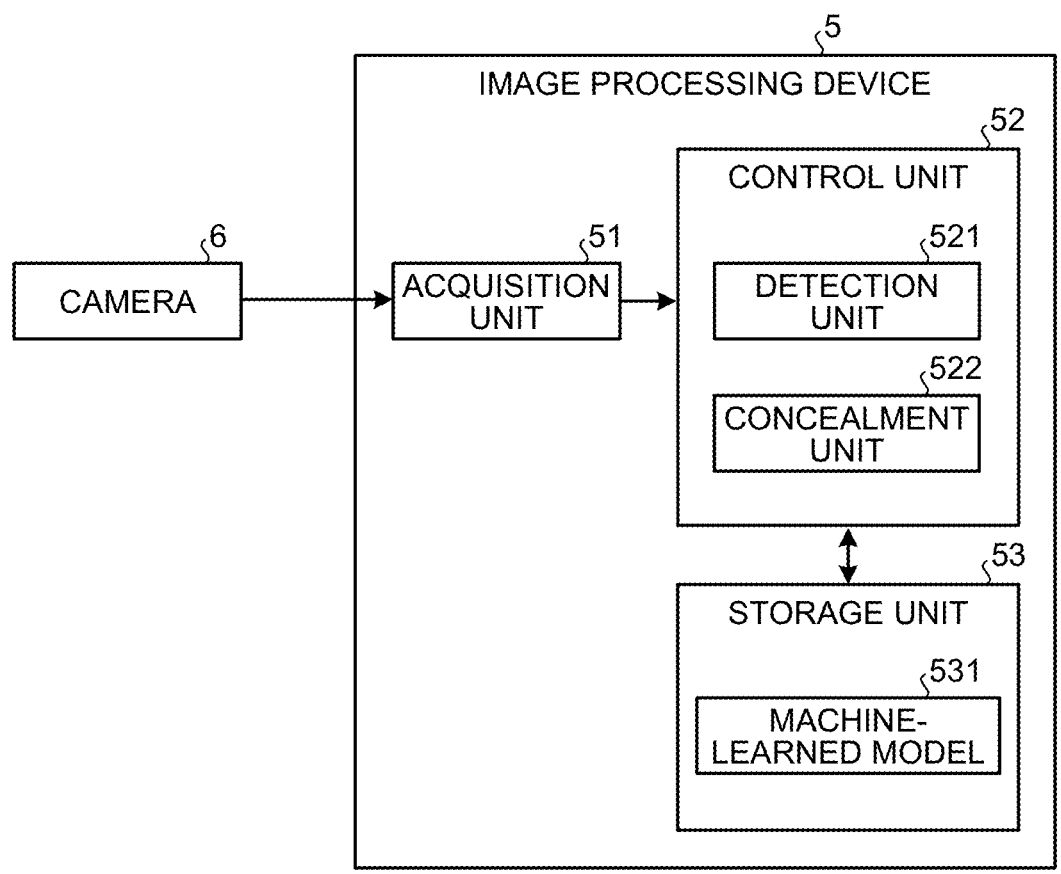
FIG. 28 is a diagram illustrating a configuration of an image processing device according to the sixth embodiment.

FIG. 28 is a diagram illustrating the configuration of the image processing device 5 according to the sixth embodiment. Note that, in FIG. 28, only components necessary for describing features of the image processing device 5 are illustrated, and a description of general components is omitted. FIG. 28 also illustrates a camera 6 which is a component separate from the image processing device 5 for easy understanding. As illustrated in FIG. 28, the image processing device 5 includes an acquisition unit 51, a control unit 52, and a storage unit 53.

The acquisition unit 51 acquires the captured image P. In the present embodiment, the acquisition unit 51 continuously acquires analog or digital captured images P from the camera 6 mounted on the vehicle at a predetermined interval (for example, an interval of 1/30 seconds). An aggregate of the captured images P acquired by the acquisition unit 51 is a moving image captured by the camera 6. In a case where the acquired captured image P is an analog captured image, the acquisition unit 51 converts the analog captured image P into digital data (A/D conversion). The acquisition unit 51 outputs the acquired captured image P (an image after conversion in a case where the A/D conversion is performed) to the control unit 52.

Note that the camera 6 is, for example, a camera that monitors an area surrounding the vehicle, such as areas in front of and behind the vehicle. However, the camera 6 may be, for example, a camera that captures an image of the interior of the vehicle.

The control unit 52 is a controller that integrally controls the entire image processing device 5. The control unit 52 is implemented by a computer including, for example, a CPU which is a hardware processor, a RAM, a ROM, and the like.

The storage unit 53 is implemented by, for example, a semiconductor memory element such as a RAM or a flash memory, a hard disk, or a storage device using a portable recording medium such as an optical disk, or the like. The storage unit 53 stores a program as firmware and various data. In the present embodiment, the storage unit 53 stores the machine-learned model 531 that enables object detection. The machine-learned model 531 is obtained by performing learning by a machine learning algorithm such as the DNN. The machine-learned model 531 may be obtained by supervised learning, for example.

A detection unit 521 and a concealment unit 522 illustrated in FIG. 28 are functions of the control unit 52 implemented by the CPU of the control unit 52 performing arithmetic processing according to a program stored in the storage unit 53. In other words, the image processing device 5 includes the detection unit 521 and the concealment unit 522. The detection unit 521 corresponds to the first detection unit 121, the setting unit 122, and the second detection unit 123.

Note that at least one of the detection unit 521 or the concealment unit 522 of the control unit 52 may be implemented by hardware such as an ASIC, an FPGA, or a GPU. In addition, the detection unit 521 and the concealment unit 522 are conceptual components. The functions executed by one component may be distributed to a plurality of components, or the functions of a plurality of components may be integrated into one component. In addition, the acquisition unit 51 may be implemented by the CPU of the control unit 52 performing arithmetic processing according to a program. Furthermore, for a specific hardware configuration of the image processing device 5, omission, replacement, or addition of components may be appropriately performed according to the embodiment. For example, the control unit 52 may include a plurality of hardware processors.

The detection unit 521 is configured to detect an object having a specific part that needs to be concealed to protect the personal information and the above-described specific part from the acquired captured image P. In the present embodiment, the detection unit 521 detects a predetermined object having a specific part that needs to be concealed or the specific part of the predetermined object from the captured image P by using the machine-learned model 531 stored in the storage unit 53. It is preferable that the detection unit 521 performs object detection by the machine-learned model 531 by using a low-resolution image obtained by reducing the resolution of the captured image P acquired from the acquisition unit 51. Note that the degree of reduction in resolution needs to be set in such a manner as not to be reduced to be equal to or lower than an accuracy required for the object detection by the machine-learned model 531. By doing so, it is possible to reduce a processing load of the object detection processing in the detection unit 521.

Examples of the predetermined object include a person, a vehicle such as an automobile, and a point name sign and the like specifying a place near a traffic light and the like. The specific part is a part that can specify a specific individual or can be used to estimate privacy of an individual. In a case where the predetermined object is a person, the specific part is, for example, a face. In a case where the predetermined object is a vehicle, the specific part is, for example, a license plate. In a case where the predetermined object is a point name sign, the specific part is, for example, a character part of the sign. Note that the predetermined object may have a plurality of specific parts. The predetermined object may include a plurality of types of objects. Furthermore, the predetermined object itself may be the specific part. The predetermined object detectable by the detection unit 521 preferably includes at least one of a person or a vehicle.

The machine-learned model 531 is preferably configured to detect the object and the specific part by using the DNN. However, the machine-learned model 531 may also be configured to detect the object and the specific part by using another machine learning algorithm such the SVM using the HOG feature amount, for example. Furthermore, the detection unit 521 may be configured to detect the object and the specific part by using, for example, template matching or the like without using the machine-learned model 531 on which machine learning has been performed.

The concealment unit 522 performs the concealment processing of concealing the object or the specific part of the captured image P based on the detection result of the detection unit 521. Furthermore, in a case where the accuracy of the object or the specific part detected by the detection unit 521 has been decreased in the current captured image $P_t$, the concealment unit 522 performs the concealment processing in such a manner that the lower the accuracy is, the wider the concealment range in which the concealment is performed is.

Furthermore, in a case where the accuracy in the current captured image $P_t$ is lower than a predetermined first threshold, when the accuracy in the past captured images $P_{t-1}$, $P_{t-2}$, and the like previous to the current captured image $P_t$ is equal to or higher than a second threshold higher than the first threshold, the concealment unit 522 determines that the accuracy has been decreased in the current captured image $P_t$.

Furthermore, in a case where the accuracy in the past captured images $P_{t-1}$, $P_{t-2}$, and the like is continuously equal to or higher than the second threshold, the concealment unit 522 determines that the accuracy has been decreased in the current captured image $P_t$.

Figure 29:
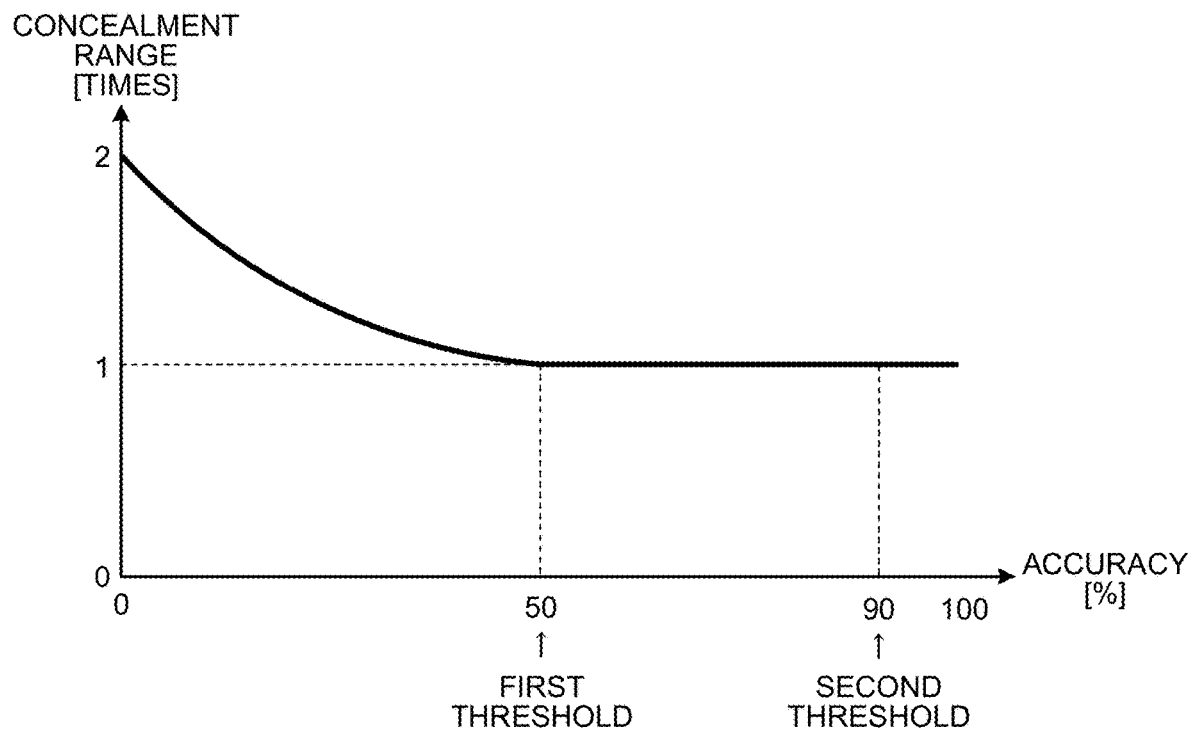
FIG. 29 is an explanatory diagram of concealment processing according to the sixth embodiment.

Here, FIG. 29 is an explanatory diagram of the concealment processing according to the sixth embodiment. Specifically, as illustrated in FIG. 29, the concealment unit 522 sets the first threshold to 50%, for example. Further, the concealment unit 522 sets the second threshold to 90%, for example.

Then, in a case where the accuracy in the current captured image $P_t$ is lower than 50%, and the accuracy in the past captured images $P_{t-1}$, $P_{t-2}$, and the like previous to the current captured image $P_t$ is equal to or higher than 90%, the concealment unit 522 determines that the accuracy has been decreased in the current captured image $P_t$.

Note that the accuracy in the past captured images $P_{t-1}$, $P_{t-2}$, and the like may be the accuracy in the past captured image $P_{t-1}$ immediately before the current captured image $P_t$, or the accuracy in the consecutive past captured images $P_{t-1}$, $P_{t-2}$, and the like. Alternatively, a statistical quantity (for example, an average) of the accuracy in the past captured images $P_{t-1}$, $P_{t-2}$, and the like may be used.

In addition, as illustrated in FIG. 29, in a case where it is determined that the accuracy has been decreased in the current captured image $P_t$, the concealment unit 522 expands the concealment range in such a manner as to be wider than the detection range according to the accuracy in the current captured image $P_t$, and performs the concealment processing.

In the example of FIG. 29, for example, the concealment unit 522 expands the concealment range in such a manner that when the accuracy in the current captured image $P_t$ is lower than 50%, the concealment range is expanded to be one time or more the detection range, and when the accuracy in the current captured image $P_t$ is 0%, the concealment range is expanded to be two times the detection range, and performs the concealment processing. As a result, it is possible to fully conceal the personal information while preventing excessive concealment.

Figure 30:
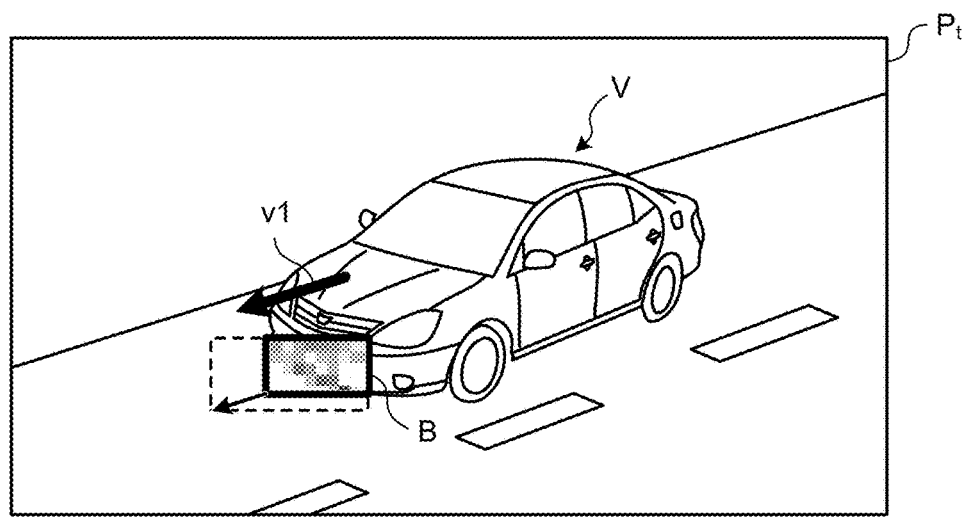
FIG. 30 is an explanatory diagram of concealment processing according to a first modified example of the sixth embodiment.

Note that the concealment unit 522 may perform the concealment processing in such a manner that the concealment range is expanded according to a motion vector of the object or the specific part detected by the detection unit 521. A first modified example that is a corresponding modified example will be described with reference to FIG. 30. FIG. 30 is an explanatory diagram of the concealment processing according to the first modified example of the sixth embodiment.

The concealment unit 522 can calculate the motion vector of the detection range based on time-series transition of the detection range in the past captured images $P_{t-1}$, $P_{t-2}$, and the like. Here, as illustrated in FIG. 30, it is assumed that the concealment unit 522 obtains a vector v1 as the motion vector of the bounding box B which is the detection range.

In such a case, the concealment unit 522 can expand the concealment range along the vector v1 as illustrated in FIG. 30. As a result, it is possible to fully conceal the detection range that needs to be concealed according to the movement of the detection range that is changed in time series.

6-2. Example of Operation of Image Processing Device

Figure 31:
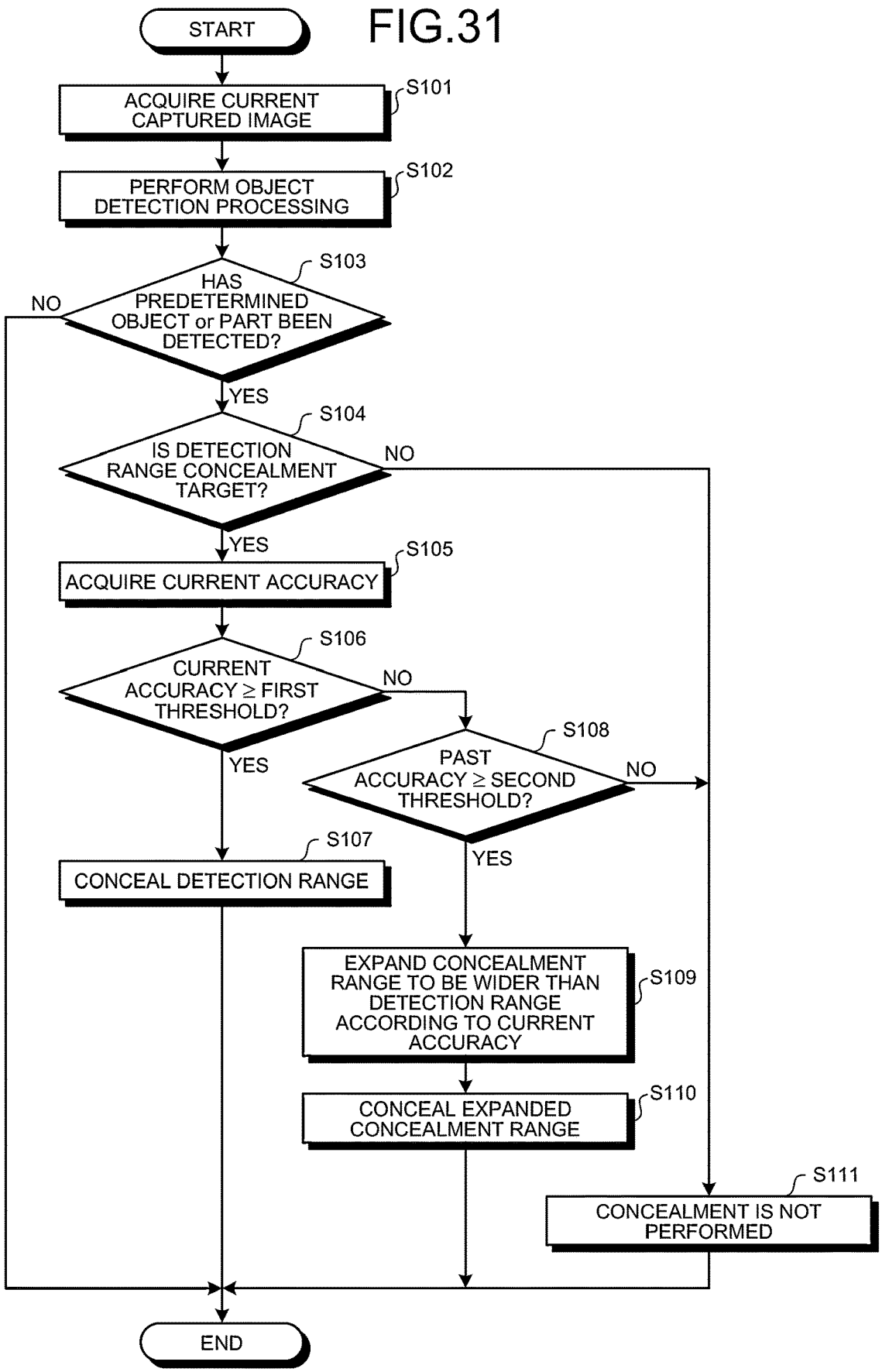
FIG. 31 is a flowchart illustrating an example of an operation of the image processing device according to the sixth embodiment.

Next, an example of an operation of the image processing device 5 according to the sixth embodiment will be described with reference to FIG. 31. FIG. 31 is a flowchart illustrating the example of the operation of the image processing device 5 according to the sixth embodiment.

As illustrated in FIG. 31, first, the acquisition unit 51 acquires the current captured image $P_t$ (Step S101). Then, the detection unit 521 performs the object detection processing on the current captured image $P_t$ by using the machine-learned model 531 (Step S102).

Then, the concealment unit 522 determines whether or not the predetermined object or the specific part has been detected by the detection unit 521 (Step S103). Here, in a case where the predetermined object or the specific part has been detected (Step S103, Yes), the concealment unit 522 determines whether or not the detection range of the object or the specific part is a concealment target (Step S104).

Here, in a case where the detection range is the concealment target (Step S104, Yes), the concealment unit 522 acquires the current accuracy output by the machine-learned model 531 (Step S105). Then, the concealment unit 522 determines whether or not the current accuracy is equal to or higher than the predetermined first threshold (for example, 50%) (Step S106).

Then, in a case where the current accuracy is equal to or higher than the first threshold (Step S106, Yes), the concealment unit 522 conceals the detection range (Step S107), and ends the processing. On the other hand, in a case where the current accuracy is lower than the first threshold (Step S106, No), the concealment unit 522 determines whether or not the past accuracy is equal to or higher than the predetermined second threshold (for example, 90%) higher than the first threshold (Step S108).

Then, in a case where the past accuracy is equal to or higher than the second threshold (Step S108, Yes), the concealment unit 522 expands the concealment range to be wider than the detection range according to the current accuracy (Step S109). Then, the concealment unit 522 conceals the expanded concealment range (Step S110), and ends the processing.

Furthermore, in a case where the past accuracy is lower than the second threshold (Step S108, No), the concealment unit 522 does not perform the concealment (Step S111), and ends the processing. Note that, in a case where the past accuracy is lower than the second threshold, since a state in which the accuracy is low continues, it is estimated that there is no portion to be concealed, and thus, the concealment is not performed. In order to more reliably estimate that there is no portion to be concealed, a third threshold lower than the first threshold can be used. Such an example will be described later with reference to FIG. 32.

In a case where the detection range is not the concealment target (Step S104, No), the concealment unit 522 does not perform the concealment (Step S111), and ends the processing.

In addition, in a case where the predetermined object or the specific part has not been detected by the detection unit 521 (Step S103, No), the concealment unit 522 does not perform the concealment processing in and after Step S104, and ends the processing.

6-3. Example of Operation of Second Modified Example

Meanwhile, in the sixth embodiment, an example in which the predetermined first threshold is used as the threshold for determining the accuracy of the detected detection range at which the concealment can be performed has been described. However, when the past accuracy is continuously high, for example, the third threshold lower than the first threshold may be set according to the current accuracy, and whether or not to perform the concealment may be determined using the third threshold.

That is, in a case where it is determined that the accuracy has been decreased in the current captured image $P_t$, the concealment unit 522 may perform the concealment processing when the accuracy is equal to or higher than the third threshold that is set according to the accuracy and is lower than the first threshold. An example of an operation of the image processing device 5 according to this modified example as a second modified example will be described with reference to FIG. 32. FIG. 32 is a flowchart illustrating the example of the operation of the image processing device 5 according to the second modified example of the sixth embodiment.

Note that FIG. 32 corresponds to FIG. 31, and Steps S201 to S208 and S213 illustrated in FIG. 32 are similar to Steps S101 to S108 and S111 in FIG. 31, respectively, and thus, will be omitted in the description using FIG. 32.

As illustrated in FIG. 32, in a case where the past accuracy is equal to or higher than the second threshold in Step S208 (Step S208, Yes), that is, in a case where it is determined that the accuracy has been decreased in the current captured image $P_t$, the concealment unit 522 sets the third threshold lower than the first threshold according to the current accuracy (Step S209).

For example, in a case where the first threshold is 50% and the current accuracy is 30%, the concealment unit 522 sets 20% as the third threshold. Then, the concealment unit 522 determines whether or not the current accuracy is equal to or higher than the third threshold (Step S210).

Then, in a case where the current accuracy is equal to or higher than the third threshold (Step S210, Yes), the concealment range is expanded to be wider than the detection range according to the current accuracy (Step S211). Then, the concealment unit 522 performs the concealment on the expanded concealment range (Step S212), and ends the processing. Note that, here, instead of Steps S211 and S212, the detection range may be simply concealed without expanding the concealment range to be wider than the detection range.

In addition, in a case where the current accuracy is lower than the third threshold (Step S210, No), the concealment unit 522 does not perform the concealment (Step S213), and ends the processing. Such a second modified example can contribute to fully concealing the detection range that needs to be concealed.

As described above, the image processing device 5 according to the sixth embodiment includes the detection unit 521 and the concealment unit 522. The detection unit 521 is configured to detect an object having a specific part that needs to be concealed to protect the personal information and the specific part from the acquired captured image P. The concealment unit 522 performs the concealment processing of concealing the object or the specific part of the captured image P based on the detection result of the detection unit 521. Furthermore, the concealment unit 522 performs the concealment processing in such a manner that the lower the accuracy (corresponding to an example of the "detection accuracy") for the object or the specific part detected by the detection unit 521 is, the wider the concealment range in which the concealment is performed is.

Therefore, with the image processing device 5 according to the sixth embodiment, the concealment for protecting the personal information performed on the captured image P can be appropriately performed.

Furthermore, in a case where the accuracy has been decreased in the current captured image $P_t$ (corresponding to an example of the "the latest captured image in time series"), the concealment unit 522 performs the concealment processing in such a manner that the lower the accuracy is, the wider the concealment range in which the concealment is performed is.

Therefore, with the image processing device 5 according to the sixth embodiment, the concealment for protecting the personal information performed on the captured images P can be appropriately performed based on a change of the captured images P in time series.

Furthermore, in a case where the accuracy in the current captured image $P_t$ is lower than the predetermined first threshold, when the accuracy in the past captured images $P_{t-1}$, $P_{t-2}$, and the like previous to the current captured image $P_t$ is equal to or higher than the second threshold higher than the first threshold, the concealment unit 522 determines that the accuracy has been decreased in the current captured image $P_t$.

Therefore, with the image processing device 5 according to the sixth embodiment, the detection range in which the detection has been made with high accuracy even once in the past can be fully concealed even when the accuracy is decreased.

Furthermore, in a case where the accuracy in the past captured images $P_{t-1}$, $P_{t-2}$, and the like is continuously equal to or higher than the second threshold, the concealment unit 522 determines that the accuracy has been decreased in the current captured image $P_t$.

Therefore, with the image processing device 5 according to the sixth embodiment, it is possible to fully conceal the detection range in which the detection has been made continuously with high accuracy in time series even when the accuracy is instantaneously decreased.

Furthermore, in a case where it is determined that the accuracy has been decreased in the current captured image $P_t$, the concealment unit 522 performs the concealment processing when the accuracy is equal to or higher than the third threshold that is set according to the accuracy and is lower than the first threshold.

Therefore, with the image processing device 5 according to the sixth embodiment, it is possible to contribute to fully concealing the detection range that needs to be concealed.

Note that the concealment unit 522 performs the concealment processing in such a manner that the concealment range is expanded according to a motion vector of the object or the specific part detected by the detection unit 521.

Therefore, with the image processing device 5 according to the sixth embodiment, it is possible to fully conceal the detection range that needs to be concealed according to the movement of the detection range that is changed in time series.

7. Remarks

In addition to the above-described embodiments, various modifications can be made to various technical features disclosed in the present specification without departing from the spirit of the technical creation. That is, it should be understood that the above-described embodiments are illustrative in all respects and are not restrictive, and the technical scope of the present invention is indicated by the claims rather than the description of the above-described embodiments, and includes all modifications falling within the meaning and scope equivalent to the claims. In addition, the plurality of embodiments and modified examples described in the present specification may be appropriately combined and implemented within a possible range.

The invention claimed is:

1. An image processing device comprising:
a controller comprising a processor or circuit and configured to function as:
a first detection unit that is configured to detect a predetermined object and a predetermined part of the predetermined object from a low-resolution image obtained by reducing a resolution of an acquired captured image;
a setting unit that sets a detection range in the captured image based on a detection result of the first detection unit in a case where (i) the predetermined object has been detected by the first detection unit and (ii) the predetermined part has not been detected by the first detection unit, the detection range being within a region of the predetermined object detected by the first detection unit in the acquired captured image, and the detection range being narrower than the region; and
a second detection unit that attempts to detect the predetermined part in the detection range in the captured image, the resolution of which is higher than that of the low-resolution image.

2. The image processing device according to claim 1, wherein
(i) a main detection target region, which is provided for detecting the predetermined object and the predetermined part, and (ii) a sub-detection target region, which is adjacent to the main detection target region and provided for complementing detection processing in the main detection target region, are set in the captured image when the detection processing is performed by the first detection unit, and
the first detection unit performs different detection processings between the main detection target region and the sub-detection target region.

3. The image processing device according to claim 1, wherein the controller is also configured to function as
a determination unit that determines whether or not the detection of the predetermined object by the first detection unit is false detection based on a detection result of the second detection unit.

4. The image processing device according to claim 1, wherein
the captured image is captured by a camera mounted on a vehicle,
the controller is further configured to function as an estimation unit that estimates a travel environment of the vehicle, and
the resolution of the low-resolution image used in detection processing by the first detection unit is adjusted based on the travel environment.

5. The image processing device according to claim 1, wherein
the captured image is captured by a camera mounted on a vehicle,
the controller is further configured to function as an estimation unit that estimates a travel environment of the vehicle, and
the first detection unit changes detection processing of detecting the predetermined object and the predetermined part based on the travel environment.

6. The image processing device according to claim 5,
wherein the first detection unit is configured to detect the predetermined object and the predetermined part by using a machine-learned model, and
the first detection unit changes the machine-learned model to be used based on the travel environment.

7. The image processing device according to claim 1, wherein
the predetermined object and the predetermined part are an object having a specific part that needs to be concealed and the specific part, respectively,
the controller is further configured to function as a concealment unit that performs concealment processing for performing concealment on the captured image based on a result of detecting the object and the specific part, and
the concealment processing is different between a case where both the object and the specific part have been detected and a case where, out of the object and the specific part, only the object has been detected.

8. The image processing device according to claim 7,
wherein the concealment processing is first concealment processing of concealing the specific part in the case where both the object and the specific part have been detected, and
the concealment processing is second concealment processing of concealing the object in the case where, out of the object and the specific part, only the object has been detected.

9. The image processing device according to claim 8, wherein
the controller is further configured to function as an image segmentation unit that performs image segmentation in which each pixel of the acquired captured image is labeled with a meaning, and
the second concealment processing is processing performed on a region corresponding to the object obtained by the image segmentation to obtain an image in which a feature of the object is reduced.

10. The image processing device according to claim 7,
wherein the concealment unit performs the concealment processing on at least one of the object and the specific part obtained from the captured image while reflecting a feature obtained from the captured image.

11. The image processing device according to claim 7,
wherein the concealment unit performs the concealment by encrypting at least one of the object and the specific part in the captured image in a decodable manner.

12. The image processing device according to claim 1, wherein
the predetermined object or the predetermined part is an object having a specific part that needs to be concealed to protect personal information or the specific part,
the controller is further configured to function as a concealment unit that performs concealment processing of concealing the object or the specific part of the captured image based on a result of detecting the object or the specific part, and
the concealment unit performs the concealment processing in such a manner that, the lower a detection accuracy for the object or the specific part is, the wider a concealment range in which the concealment is performed is.

13. A method of image processing comprising:
detecting a predetermined object and a predetermined part of the predetermined object from a low-resolution image obtained by reducing a resolution of an acquired captured image;
setting a detection range in the captured image based on a result of the detecting in a case where (i) the predetermined object has been detected and (ii) the predetermined part has not been detected, the detection range being within a region of the detected predetermined object in the acquired captured image, and the detection range being narrower than the region; and
attempting to detect the predetermined part in the detection range in the captured image, the resolution of which is higher than that of the low-resolution image.

14. An image processing device comprising:
a controller comprising a processor or circuit and configured to function as:
  a first detection unit that is configured to detect a predetermined object and a predetermined part of the predetermined object from an acquired captured image, the predetermined object and the predetermined part being (i) an object having a specific part that needs to be concealed and (ii) the specific part, respectively; and
  a concealment unit that performs concealment processing for performing concealment on the captured image based on a result of detecting the object and the specific part, wherein
the concealment processing is first concealment processing of concealing the specific part in a case where both the object and the specific part have been detected, and
the concealment processing is second concealment processing of concealing the object in a case where, out of the object and the specific part, the object has been detected and the specific part has not been detected by the first detection unit.

15. The image processing device according to claim 14, wherein the concealment unit performs the concealment processing on at least one of the object and the specific part obtained from the captured image while reflecting a feature obtained from the captured image.

16. The image processing device according to claim 14, wherein the concealment unit performs the concealment by encrypting at least one of the object and the specific part in the captured image in a decodable manner.

17. The method according to claim 13, wherein
the predetermined object or the predetermined part is an object having a specific part that needs to be concealed to protect personal information or the specific part,
the method further comprising performing concealment processing of concealing the object or the specific part of the captured image based on a result of detecting the object or the specific part, and
the concealment processing is performed in such a manner that, the lower a detection accuracy for the object or the specific part is, the wider a concealment range in which the concealment is performed is.

18. The method according to claim 17, wherein
the predetermined object and the predetermined part are an object having a specific part that needs to be concealed and the specific part, respectively,
the method further comprises performing concealment processing for performing concealment on the captured image based on a result of detecting the object and the specific part, and
the concealment processing is different between a case where both the object and the specific part have been detected and a case where, out of the object and the specific part, only the object has been detected.

* * * * *